US006353791B1

(12) United States Patent
Tuken et al.

(10) Patent No.: US 6,353,791 B1
(45) Date of Patent: Mar. 5, 2002

(54) APPARATUS AND METHOD FOR DETERMINING ENGINE STATIC TIMING ERRORS AND OVERALL SYSTEM BANDWIDTH

(75) Inventors: Taner Tuken; Donald J. Benson; John T. Carroll, III, all of Columbus, IN (US)

(73) Assignee: Cummins, Inc., Columbus, IN (US)

( * ) Notice: Subject to any disclaimer, the term of this patent is extended or adjusted under 35 U.S.C. 154(b) by 0 days.

(21) Appl. No.: 09/564,776

(22) Filed: May 4, 2000

(51) Int. Cl.[7] .......................... F02M 45/12; G05D 1/00; G06F 17/00

(52) U.S. Cl. ....................... 701/114; 123/447; 123/501; 701/105

(58) Field of Search ................................ 123/445, 446, 123/447, 456, 467, 501, 502, 503, 478, 480; 701/103, 104, 105, 114, 115

(56) References Cited

U.S. PATENT DOCUMENTS

| | | | | |
|---|---|---|---|---|
| 4,777,921 A | | 10/1988 | Miyaki et al. | 123/456 |
| 4,825,369 A | | 4/1989 | Oshizawa | 701/105 |
| 5,197,438 A | | 3/1993 | Yamamoto | 123/506 |
| 5,201,294 A | | 4/1993 | Osuka | 123/458 |
| 5,268,842 A | | 12/1993 | Marston et al. | 701/105 |
| 5,277,156 A | | 1/1994 | Osuka et al. | 123/198 DB |
| 5,311,850 A | | 5/1994 | Martin | 123/456 |
| 5,313,924 A | | 5/1994 | Regueiro | 123/456 |
| 5,441,027 A | | 8/1995 | Buchanon et al. | 123/446 |
| 5,533,477 A | | 7/1996 | Weigl | 123/494 |
| 5,634,448 A | | 6/1997 | Shinogle et al. | 123/480 |
| 5,676,114 A | | 10/1997 | Tarr et al. | 123/446 |
| 5,678,521 A | | 10/1997 | Thompson et al. | 123/447 |
| 5,727,525 A | | 3/1998 | Tsuzuki | 123/447 |
| 5,732,381 A | | 3/1998 | Guido et al. | 701/104 |
| 5,732,679 A | | 3/1998 | Takahasi et al. | 123/467 |
| 5,752,486 A | | 5/1998 | Nakashima et al. | 123/467 |
| 5,771,861 A | | 6/1998 | Musser et al. | 123/357 |
| 5,775,304 A | | 7/1998 | Kono et al. | 123/497 |
| 5,819,704 A | | 10/1998 | Tarr et al. | 123/467 |
| 6,053,147 A | * | 4/2000 | Hemmerlein et al. | 123/447 |
| 6,076,504 A | * | 6/2000 | Stavnheim et al. | 123/447 |

* cited by examiner

*Primary Examiner*—Willis R. Wolfe
(74) *Attorney, Agent, or Firm*—Barnes & Thornburg

(57) ABSTRACT

A strategy for quantifying and compensating for between-engine variations in engine static timing, fuel pump phasing and overall system bandwidth includes a control circuit operable to manage a fuel control system including a high pressure, cyclically operable fuel pump and at least one fuel injector operable to supply fuel to an internal combustion engine from a fuel collection unit. In one embodiment, the strategy of the present invention is operable to determine peak values of the fuel pressure within fuel collection unit and corresponding engine position values for a number of different engine speeds and solve a corresponding model-based system of equations to determine a combined engine static timing and fuel pump phasing error as well as a first overall system bandwidth value. In another embodiment, the strategy of the present invention is operable to determine peak values of the pressure within a combustion chamber of the engine along with associated engine position values for a number of different engine speeds and solve for the engine static timing error alone and/or a second overall system bandwidth value. In yet another embodiment, the two foregoing strategies may be combined to produce separately the first and second bandwidth values as well as the individual engine static timing and fuel pump phasing error values. In any case, the computed error and bandwidth values may be used to improve the accuracy of sampled engine and/or fuel control system parameters as they relate to engine position.

27 Claims, 11 Drawing Sheets

APPARATUS AND METHOD FOR DETERMINING ENGINE STATIC TIMING ERRORS AND OVERALL SYSTEM BANDWIDTH

FIELD OF THE INVENTION

The present invention relates generally to systems and techniques for controlling the operation of an internal combustion engine, and more specifically to such systems wherein the efficacy of such control is based on the accuracy of fuel system related operating parameters.

BACKGROUND OF THE INVENTION

Modern high pressure fuel systems for internal combustion engines typically employ sophisticated control techniques for monitoring and controlling multiple fuel system operating parameters including, for example, fuel supply pressure, injection pressure, engine timing, rate shape, injected fueling, and the like. However, even with such advanced control techniques, engine-to-engine (between-engine) variations are known to exist in at least some of the typically monitored fuel system operating parameters. For example, many high pressure fuel and/or engine control systems are sensitive to between-engine variations in engine static timing and pump phasing as well as overall system bandwidth. For purposes of the present invention, an engine static timing error is defined as any difference between a measured engine reference position (e.g., top-dead-center or TDC) and the actual reference position, which may vary from engine to engine, and a fuel pump phasing error is defined as any difference between a fuel pump reference position and a corresponding engine reference position.

As one particular example of the foregoing problem, engine static timing errors are known to be a significant contributor to variations in start-of-injection (SOI) in known fuel control systems. As another example, although accurate fuel supply pressure sensors and engine position sensors are widely used in high pressure fuel control systems, such between-engine variations typically exist with regard to the placement of peak supply pressures relative to a reference engine position. More specifically, fuel pumps in cyclic, high pressure fuel control systems would typically be controlled such that fuel supply pressure peaks are expected to occur at some predefined crank angle relative to a reference crank angle (e.g., top-dead-center or TDC) for each cylinder at a given engine speed. However, due to between-engine variations in engine static timing and fuel pump phasing, such fuel supply pressure peaks have been found to deviate from the predefined crank angle by fixed amounts or offsets from engine to engine. Similarly, due to between-engine variations in overall system bandwidth, such fuel supply pressure peaks have also been found to deviate from the predefined crank angle by variable amounts as a function of engine speed.

Minimizing such variations by conventional mechanical means requires tightening tolerances or system specifications, both of which typically result in increased system cost. What is therefore needed is a strategy for quantifying and compensating for between-engine variations in engine static timing and fuel pump phasing and overall system bandwidth that does not require additional hardware components and generally does not increase system cost. Ideally, such a strategy should further provide for more accurate fuel system operating parameter monitoring and control, and further provide for improved diagnostic capabilities.

SUMMARY OF THE INVENTION

The foregoing shortcomings of the prior art are addressed by the present invention. In accordance with one aspect of the present invention, an apparatus for determining errors in monitored operating parameters of a fuel system for an internal combustion engine comprises means for sensing a pressure associated with a fuel system of an internal combustion engine and producing a pressure signal corresponding thereto, the pressure signal having peak values corresponding to peak pressure values thereof, means for sensing a reference position of the internal combustion engine and producing a reference position signal corresponding thereto, means for determining first and second engine positions at which peak values of the pressure signal occur at first and second engine speeds, and means for determining a first operating parameter error value as a function of the first and second engine positions relative to the engine position.

In accordance with another aspect of the present invention, an apparatus for determining errors in monitored operating parameters of a fuel system for an internal combustion engine comprises a pressure sensor for sensing a pressure associated with a fuel system of an internal combustion engine and producing a pressure signal corresponding thereto, wherein the pressure signal has peak values corresponding to peak pressures thereof, an engine position sensor producing a reference position signal corresponding to a reference position of the internal combustion engine, and a control circuit responsive to the pressure signal for determining a first engine position at which a peak value of the pressure signal occurs. The control circuit is further operable to determine an operating parameter error value as a function of the first engine position relative to the reference engine position.

In accordance with a further aspect of the present invention, a method of determining errors in monitored operating parameters of a fuel system for an internal combustion engine comprises the steps of sensing a pressure associated with a fuel system of an internal combustion engine and producing a pressure signal having peak values corresponding thereto, sensing a reference position associated with the operation of the internal combustion engine, determining an offset value as a difference between an engine position at which peak values of the pressure signal occur and the reference engine position, and determining an operating parameter error value as a function of the offset value.

One object of the present invention is to provide a strategy for determining engine static timing errors and overall system bandwidth.

Another object of the present invention is to provide such a strategy for determining engine static timing, high pressure fuel pump phasing and overall hydro-mechanical system bandwidth errors relating to a fuel control system of an internal combustion engine.

These and other objects of the present invention will become more apparent from the following description of the preferred embodiments.

DESCRIPTION OF THE PREFERRED EMBODIMENTS

Figure 1A:
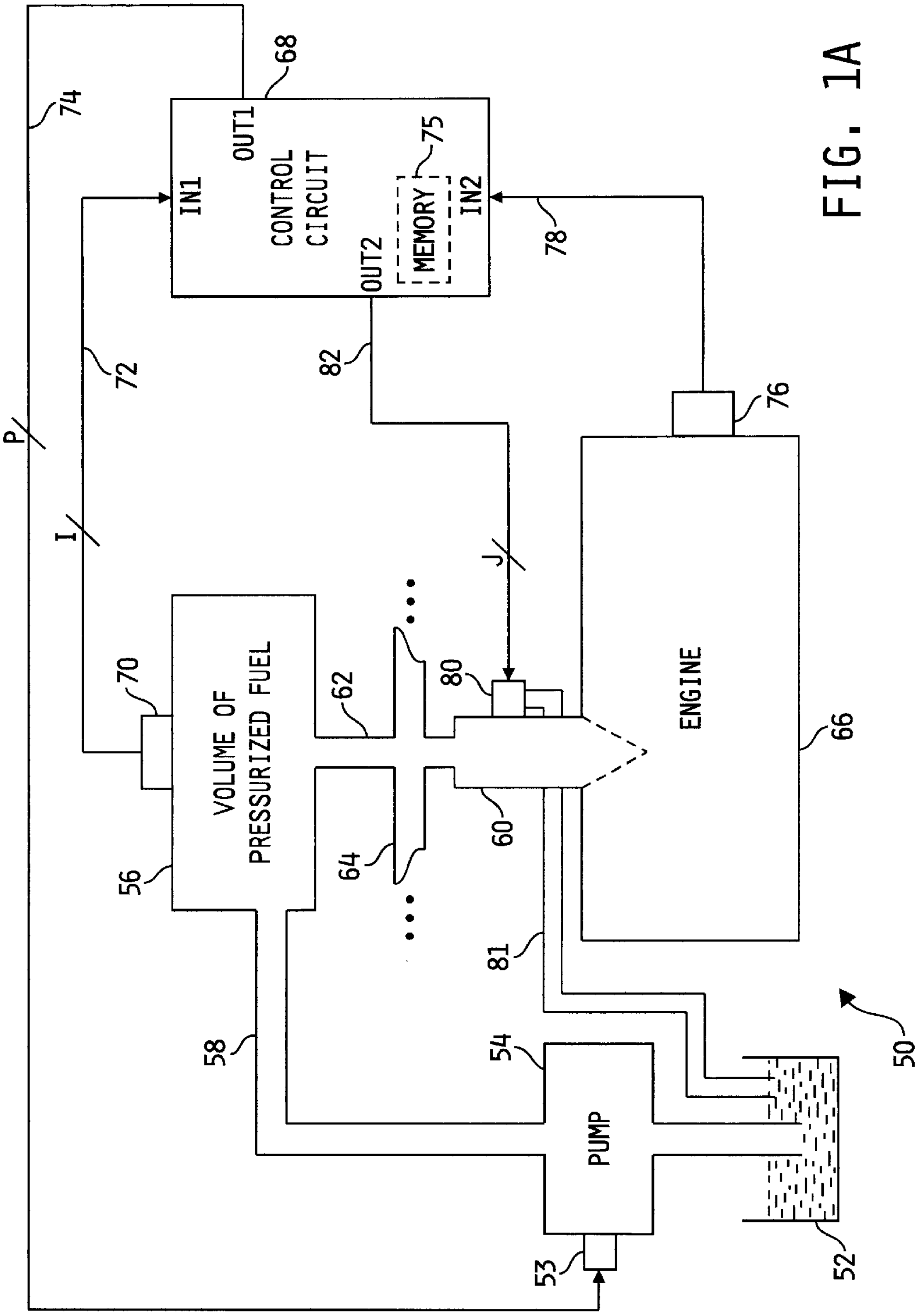
FIG. 1A is a diagrammatic illustration of one embodiment of a fuel control system for an internal combustion engine, in accordance with the present invention.

For the purposes of promoting an understanding of the principles of the invention, reference will now be made to preferred embodiments illustrated in the drawings and specific language will be used to describe the same. It will nevertheless be understood that no limitation of the scope of the invention is thereby intended, such alterations and further modifications in the illustrated embodiments, and such further applications of the principles of the invention as illustrated therein being contemplated as would normally occur to one skilled in the art to which the invention relates.

Referring now to FIG. 1A, one preferred embodiment of an electronic fuel control system 50, in accordance with the present invention, is shown. Fuel control system 50 includes a source of fuel 52; e.g. diesel engine fuel, having an inlet port of a fuel pump 54 in fluid communication therewith. In one embodiment, fuel pump 54 is a high pressure pump configured to supply high pressure fuel from fuel supply 52, which may typically be a low pressure fuel supply pump operable to supply low pressure fuel from a fuel source to fuel pump 54, to a fuel collection unit 56, in a cyclic fashion, via supply passage 58. It is to be understood, however, that the present invention contemplates that pump 54 may alternatively be configured to supply pressurized fuel in a non-cyclic fashion. In any case, in the system 50 of FIG. 1A, fuel collection unit 56 is fluidly connected to a fuel injector 60 via supply passage 62, and fuel injector 60 is configured to be mounted to an internal combustion engine 66 in fluid communication with a combustion chamber thereof as is known in the art. Fuel collection unit 56 may optionally be fluidly coupled to additional fuel injectors via supply passage 64. In the embodiment shown in FIG. 1A, the fuel collection unit 56 is conventionally referred to as a fuel storage unit, or fuel accumulator.

Central to the electronic control of pump 54 and injector 60 is a control circuit 68 having a memory unit 75 associated therewith. In one embodiment, control circuit 68 is a control computer of known construction, wherein such a circuit 68 is typically referred to by those skilled in the art as an electronic (or engine) control module (ECM), engine control unit (ECU) or the like, although the present invention contemplates that control circuit 68 may alternatively be any circuit capable of performing the functions described hereinafter with respect to circuit 68. In any case, control circuit 68 is operable, at least in part, to control the fueling of engine 66 in accordance with one or more software algorithms stored within memory unit 75.

System 50 includes a number of sensors and/or sensor subsystems for providing control circuit 68 with operational information relating to some of the components of system 50 as well as certain engine operating information. For example, fuel collection unit 56 includes a pressure sensor 70 electrically connected to an input IN1 of control circuit 68 via a number, I, of signal paths 72, wherein I may be any positive integer. Sensor 70 is preferably a known sensor operable to sense the pressure of the volume of pressurized fuel within collection unit 56 and provide a fuel pressure signal corresponding thereto to input IN1 of control circuit 68 via signal paths 72, as is known in the art. System 50 further includes an engine speed/position sensor 76 electrically connected to an input IN2 of control circuit 68 via signal path 78. In one embodiment, sensor 76 is a known engine speed/position sensor including a Hall effect sensor disposed proximate to a toothed gear or wheel rotating synchronously with the crankshaft of the engine (not shown).

Preferably, the toothed gear or wheel includes a number of equi-angularly spaced teeth as well as an extra tooth disposed between adjacent ones of the equi-angularly spaced teeth. Sensor 76 is operable to produce an engine speed/position signal (ES/P) including information relating to the rotational speed of the engine crank shaft (not shown) based on the passage thereby of the equi-angularly spaced teeth, as well as information relating to engine position relative to a reference engine position (e.g., angle of the crank shaft (crank angle) relative to a top-dead-center (TDC) position of the engine cylinder or combustion chamber in question) based on passage thereby of the extra tooth. Alternatively, system 50 may substitute the sensor 76 just described with one or more known sensors producing equivalent information in the form of one or more electrical signals.

Control circuit 68 further includes a number of outputs by which certain components of system 50 may be electronically controlled. For example, output OUT1 of control circuit 68 is electrically connected to an actuator 53 of fuel pump 54 via a number, P, of signal paths 74, wherein P may be any positive integer, and wherein actuator 53 may be a solenoid or other known actuator. In any case, actuator 53 of pump 54 is responsive to a pump command signal produced by control circuit 68 on signal paths 74 to cause the pump 54 to supply fuel from fuel supply 52 to fuel collection unit 56. Output OUT2 of control circuit 68 is electrically connected to an actuator 80 (e.g., solenoid) of fuel injector 60 via a number, J, of signal paths 82, wherein J may be any positive integer, whereby actuator 80 is responsive to a fuel command signal produced by control circuit 68 on signal paths 82 to actuate injector 60 to thereby dispense a quantity of fuel from fuel collection unit 56 into a combustion chamber of engine 66. Actuator 80 further includes a passageway 81 for directing fuel non-injected fuel from fuel injector 60 back to fuel source 52 as is known in the art.

It is to be understood that in the embodiment illustrated in FIG. 1A, system 50 may include any number of fuel pumps 54, fuel collection units 56, fuel injectors 60 and associated passageways as indicated by the integer designations of signal paths 72, 74, 80 and 90. As one specific example, system 50 configured for a 6 cylinder engine may include a pair of fuel pumps 54, a pair of fuel collection units 56 and six fuel injectors 60 wherein one fuel pump 54 and associated fuel collection unit 56 is operable to supply pressurized fuel to a first bank of three fuel injectors (e.g., front bank) and the other fuel pump 54 and associated fuel collection unit 56 is operable to supply pressurized fuel to a second bank of three fuel injectors (e.g., rear bank). Those skilled in the art will recognize other combinations of fuel pump 54, fuel collection unit 56, fuel injector 60 and associated passageways, and that other such combinations are intended to fall within the scope of the present invention.

Figure 1B:
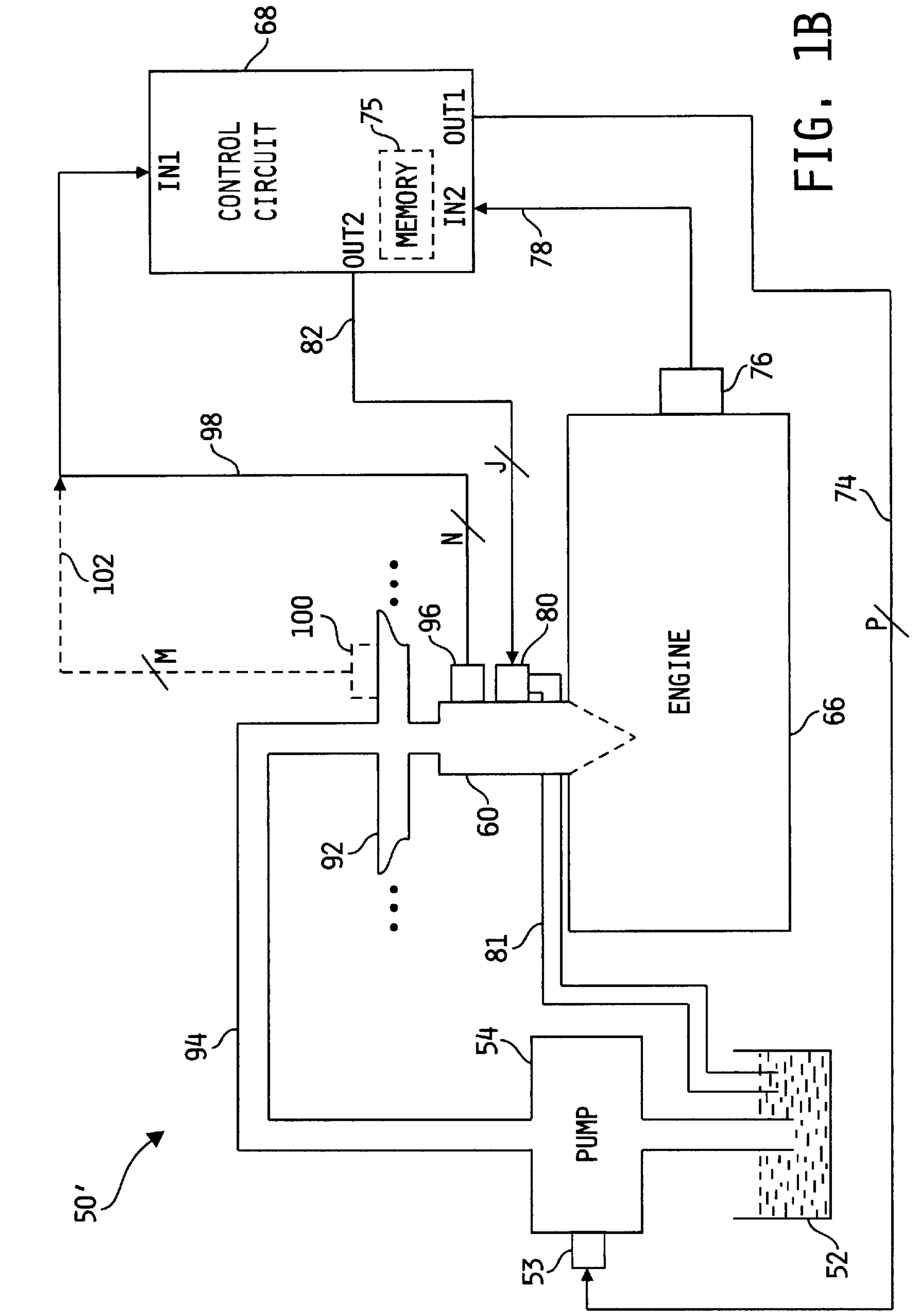
FIG. 1B is a diagrammatic illustration of an alternate embodiment of a fuel control system for an internal combustion engine, in accordance with the present invention.

Referring now to FIG. 1B, an alternative embodiment of an electronic fuel control system 50', in accordance with the present invention, is shown. System 50' is identical in many respects to system 50 of FIG. 1A, and like reference numbers are therefore used to identify like components. System 50' of FIG. 1B differs from system 50 of FIG. 1A in that fuel pump 54 is fluidly connected directly to a so-called fuel "rail" 92 via supply passage 94, wherein the fuel rail 92 is fluidly connected to injector 60 and optionally to a number of additional fuel injectors (not shown). In one embodiment of the fuel control system 50' illustrated in FIG. 1B, the "fuel collection unit" is comprised of the fuel storage portion of fuel injector 60, whereby a pressure sensor 96 suitably located relative to injector 60 is electrically connected to input IN1 of control circuit 68 via a number, N, of signal paths 98 as shown in phantom in FIG. 1B. In this embodiment, pressure sensor 96 is operable to sense the pressure of fuel within injector 60 and provide a corresponding number, N, of fuel pressure signals corresponding thereto, wherein N may be any positive integer.

In an alternative embodiment of the system 50' illustrated in FIG. 1B, the "fuel collection unit", as this term is used hereinabove, is comprised of the fuel rail 92, wherein a pressure sensor 100 suitably located relative to rail 92 is electrically connected to input IN1 of control circuit 68 via a number, M, of signals path 102 as shown in phantom in FIG. 1B. In this embodiment, pressure sensor 100 is operable to sense the pressure of fuel within fuel rail 92 and provide a corresponding number, M, of fuel pressure signals corresponding thereto, wherein M may be any positive integer. It is to be understood that in either embodiment of the fuel control system 50' of FIG. 1B, any number of fuel pumps 54, fuel injectors 60 and fuel rails 94 may be provided and fluidly connected to any desired combinations or groupings of fuel injectors 60, as described with respect to FIG. 1A, to thereby accommodate any desired fuel pump/fuel/rail/fuel injector combinations or groupings. In any case, it should now be readily apparent that the term "fuel collection unit", as it relates to the present invention, may be understood to identify any of an accumulator-type storage unit, such as unit 56 of FIG. 1A, a fuel rail-type storage unit, such as fuel rail 94, or a fuel injector-type storage unit, such as the fuel storage portion of injector 60, and that the term "fuel storage pressure" refers to the pressure of fuel stored within any of the foregoing fuel collection units.

Figure 1C:
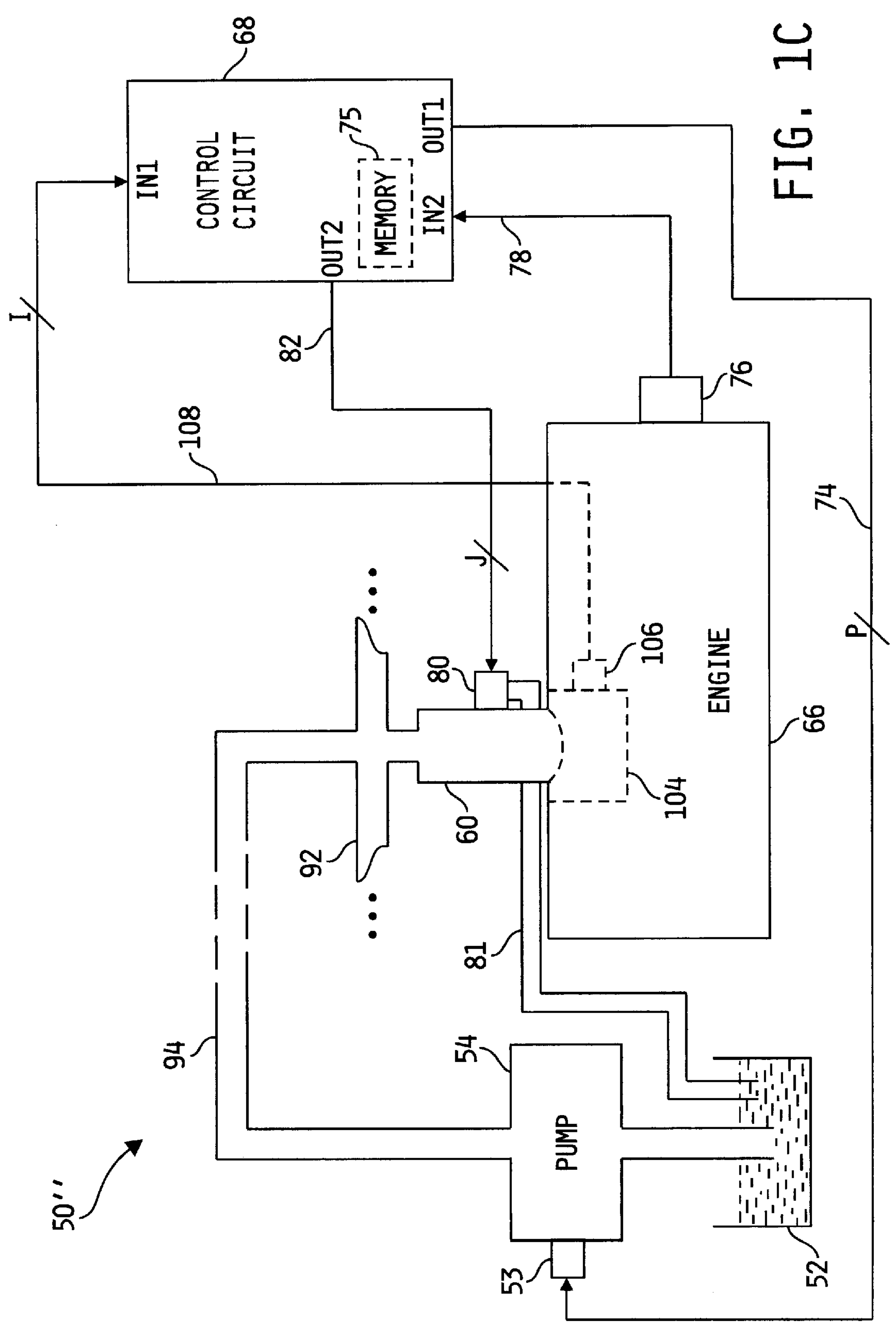
FIG. 1C is a diagrammatic illustration of another alternate embodiment of a fuel control system for an internal combustion engine, in accordance with the present invention.

Referring now to FIG. 1C, yet another alternative embodiment of an electronic fuel control system 50", in accordance with the present invention, is shown. System 50" is identical in many respects to systems 50 of FIG. 1A and 50" of FIG. 1B, and like reference numbers are therefore used to identify like components. System 50" of FIG. 1C differs from systems of FIGS. 1A and 1B in that fuel pump 54 may be fluidly connected directly to a so-called fuel "rail" 92 via supply passage 94, or may alternatively be fluidly coupled thereto via an accumulator-type fuel collection unit (e.g. fuel collection unit 56 of FIG. 1A), and illustration of these two alternatives are represented in FIG. 1C as a dashed-line connection between supply passage 94 and fuel rail 92. For purposes of the present invention, system 50" of FIG. 1C may or may not include a fuel supply pressure sensor (e.g., pressure sensor 70, 96 or 100). However, system 50" preferably includes a cylinder pressure sensor 106 suitably disposed relative to a combustion chamber 104 of cylinder of engine 66 and electrically connected to input IN1 of control circuit 68 via a number, I, of signal paths 108 wherein I may be any positive integer. In this embodiment, pressure sensor 106 is operable to provide a cylinder pressure signal (CP) on signal path 108 that is indicative of the pressure within the combustion chamber 104, wherein engine 66 may have any number of fuel injector 60 and combustion chamber 104 pairs and associated pressure sensors 106. It is to be understood, however, that the present invention contemplates other known techniques for computing or estimating cylinder pressure, and that such other computing or estimating techniques are intended to fall within the scope of the present invention.

Figure 2A:
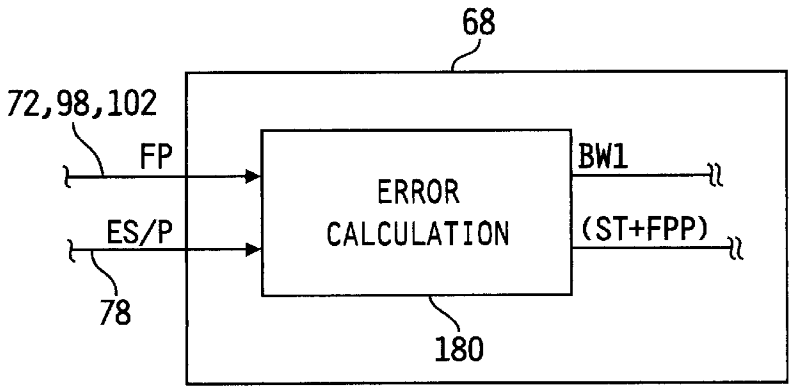
FIG. 2 is composed of FIGS. 2A, 2B and 2C wherein each figure represents a diagrammatic illustration of three distinct embodiments of an error calculation block forming part of the control computer illustrated in any one or more of FIGS. 1A–1C, in accordance with the present invention.

Engine static timing and fuel pump phasing errors as well as overall system bandwidth relating to any of systems 50, 50' and 50" are, in accordance with the present invention, quantified with respect to engine 66 so that between-engine variations in engine static timing and fuel pump phasing as well as overall system bandwidth may be compensated for. For purposes of the present invention, the term "overall system bandwidth" is defined as any single one or combination of a pneumatic, mechanical, hydraulic or electrical system that contributes to the operating bandwidth of monitored pressure, wherein the term "monitored pressure" is defined for purposes of the present invention as either the fuel storage pressure monitored by any of the sensors 70, 96 and/or 100, or the cylinder pressure monitored by sensor 106. In any case, it is known that the phase delay of a system, such as with the various fuel systems illustrated in FIGS. 1A–1C, varies with operating frequency (i.e., engine speed), but that engine static timing and fuel pump phasing errors do not. Using these relationships, a engine static timing error and a fuel pump phasing error, as well as overall system bandwidth, are measured, in accordance with the present invention, by monitoring certain features of the cyclic fuel supply or combustion chamber pressure signals relative to engine position (e.g., crank angle) for at least two different engine speeds (preferably during motoring conditions as will be described more fully hereinafter), and then back-calculating the desired parameter values using this information according to a frequency response model. In one embodiment, for example with respect to either system 50 of FIG. 1A or system 50' of FIG. 1B, control circuit 68 is operable to monitor the cyclically varying pressure of the fuel collection unit (i.e., via pressure sensor 70, 96 or 100) for at least two different engine speeds, determine an engine position (e.g., crank angle) relative to a reference engine position at which the fuel pressure peaks occur for each engine speed, and determine therefrom the system bandwidth and combined engine static timing and pump phasing errors. This arrangement is shown in block diagram form in FIG. 2A which shows control circuit 68 receiving as input signals the fuel pressure signal on signal path 72, 98 or 102 and the engine speed/position signal ES/P on signal path 78, and including an error calculation block 180 producing as outputs a first system bandwidth value BW1 and a combined engine static timing and fuel pump phasing error value (ST+FPP), wherein the first system bandwidth value BW1 is dependent upon the fuel system itself, operation of the fuel collection unit and fuel pressure sensor and other hardware associated with control circuit 68.

Figure 2B:
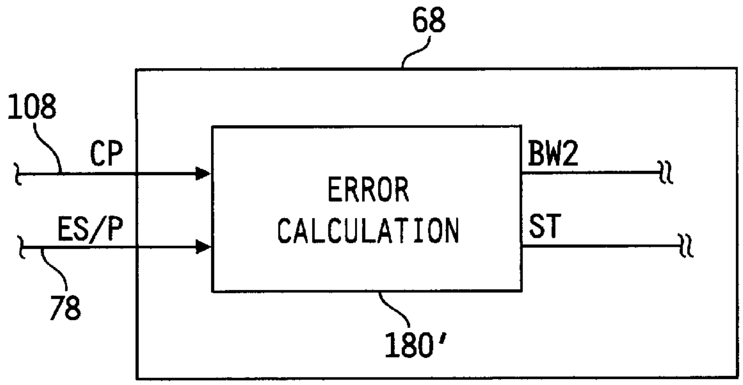

In an alternate embodiment, fuel pump phasing errors can be avoided (i.e., fuel pump phasing errors are bypassed) if combustion chamber pressure is used in lieu of fuel collection unit pressure in the calculations. In this embodiment, for example with respect to system 50" of FIG. 1C, control circuit 68 is operable to monitor the cyclically varying combustion chamber pressure or cylinder pressure signal (CP) on signal path 108 for at least two different engine speeds (wherein the fuel pressure supplied by the fuel collection unit may be either cyclic or noncyclic), determine an engine position (e.g., crank angle) relative to a reference engine position at which the cylinder pressure peaks occur for each engine speed as before, and determine therefrom a second overall system bandwidth that is different from the first overall system bandwidth value BW1, and the engine static timing error that is identical to the engine static timing error ST described with respect to FIG. 2A. This arrangement is shown in block diagram form in FIG. 2B which shows control circuit 68 receiving as input signals the cylinder pressure signal on signal path 108 and the engine speed/position signal ES/P on signal path 78, and an error calculation block 180' producing as outputs a second system bandwidth value BW2 that is different from the first system bandwidth value BW1, and the engine static timing error value ST (identical to ST of FIG. 2A). The second bandwidth value BW2, as compared with BW1, is a function of engine operation, the operation of the cylinder pressure sensor 108 and other hardware associated with control circuit 68.

Figure 2C:
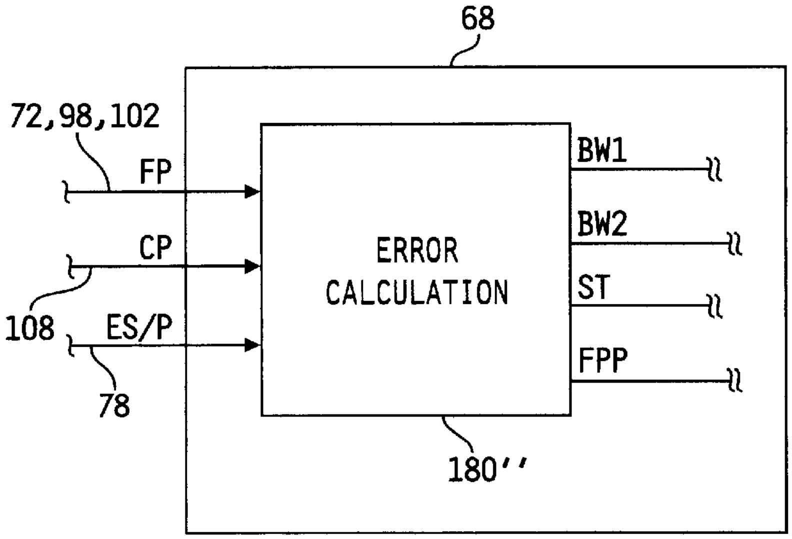

In another alternate embodiment, all of the above information can be individually obtained by combining the information available in system 50 and/or 50' with the information available in system 50". In this embodiment, control circuit 68 is operable to monitor the fuel pressure signal on signal path 72, 98 and/or 102 as well as the cylinder pressure signal (CP) on signal path 108 for at least two different engine speeds, determine an engine position (e.g., crank angle) relative to a reference engine position at which the corresponding pressure peaks occur for each engine speed as before, and determine therefrom the first and second system bandwidth values, BW1 and BW2, that are identical to the bandwidth values BW1 and BW2 described with respect to FIGS. 2A and 2B respectively, the engine static timing error (ST) as described with respect to FIG. 2B, and the combined engine static timing and fuel pump phasing error (ST+FPP) as described with respect to FIG. 2A. Having the combined engine static timing and fuel pump phasing error value (ST+FPP) and the engine static timing error value ST, control circuit 68 may accordingly compute the individual fuel pump phasing error FPP as a difference thereof. This arrangement is shown in block diagram form in FIG. 2C which shows control circuit 68 receiving as input signals the fuel pressure signal on signal path 72, 98 and/or 102, the cylinder pressure signal on signal path 108 and the engine speed/position signal ES/P on signal path 78, and an error calculation block 180" producing as individual outputs the first and second system bandwidth values BW1 and BW2, the engine static timing error value ST and the fuel pump phasing error value FPP.

Figure 3:
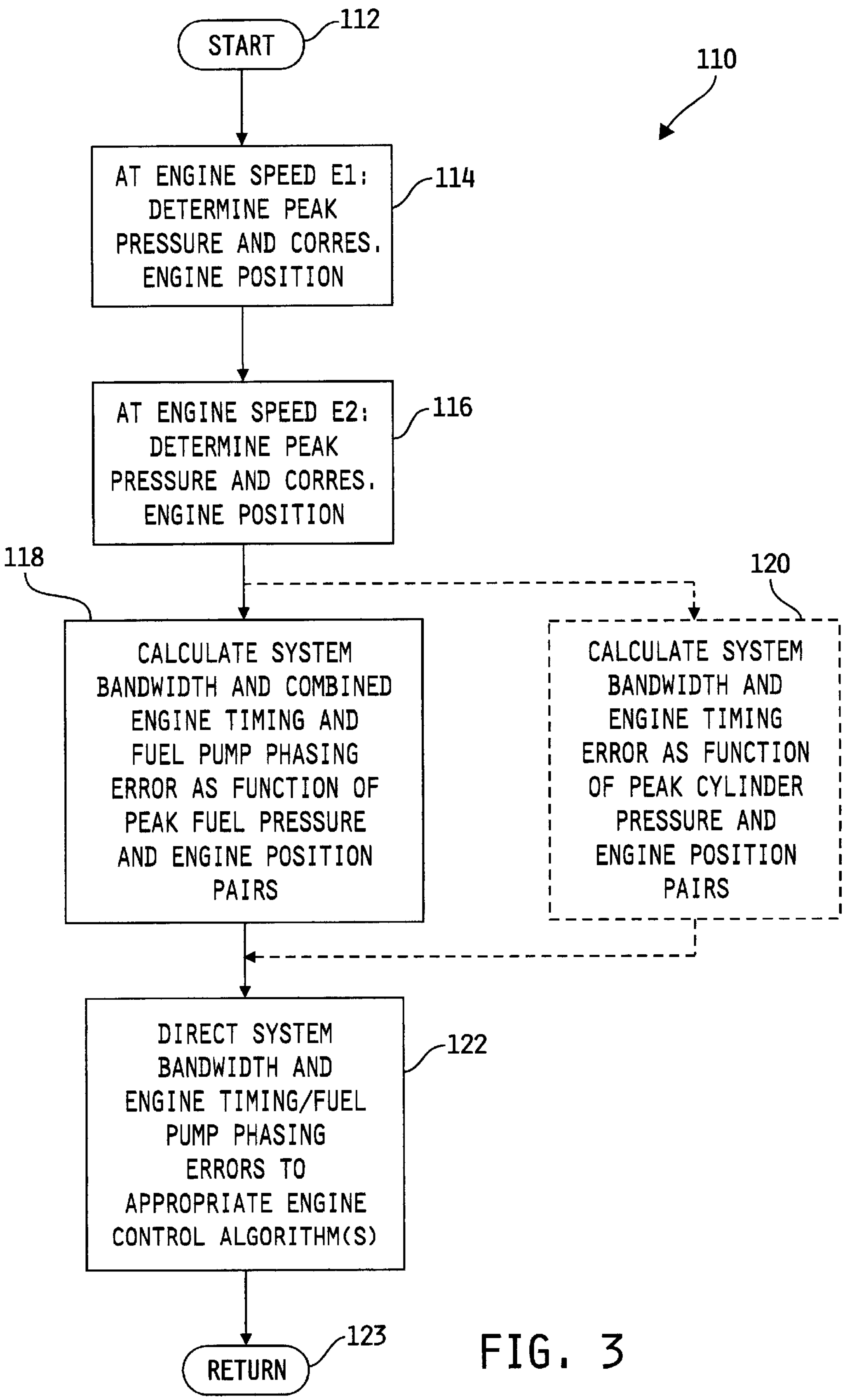
FIG. 3 is a flowchart illustrating one embodiment of a software algorithm for carrying out the concepts of the present invention.

Referring now to FIG. 3, a flowchart is shown illustrating a software algorithm 110 that is preferably stored within memory 75 of control circuit 68, and is executable by control circuit 68 in order to carry out at least some of the concepts of the present invention. Algorithm 110 begins at step 112, and at step 114, control circuit 68 is operable to determine a peak pressure and corresponding engine position at a first engine speed E1. In one embodiment, for example with reference to system 50 of FIG. 1A or system 50' of FIG. 1B, the term "peak pressure" is defined as a peak pressure of fuel within the fuel collection unit (e.g., fuel storage unit 56, fuel rail 94 or fuel injector 60) as determined in accordance with the cyclic fuel pressure signal produced by an associated pressure sensor (e.g., sensor 70, 96 or 100). In an alternate embodiment, for example with reference to system 50" of FIG. 1C, the term "peak pressure" is defined as a peak cylinder pressure within combustion chamber 104 as determined in accordance with the cyclic cylinder pressure signal produced by pressure sensor 106.

Figure 6:
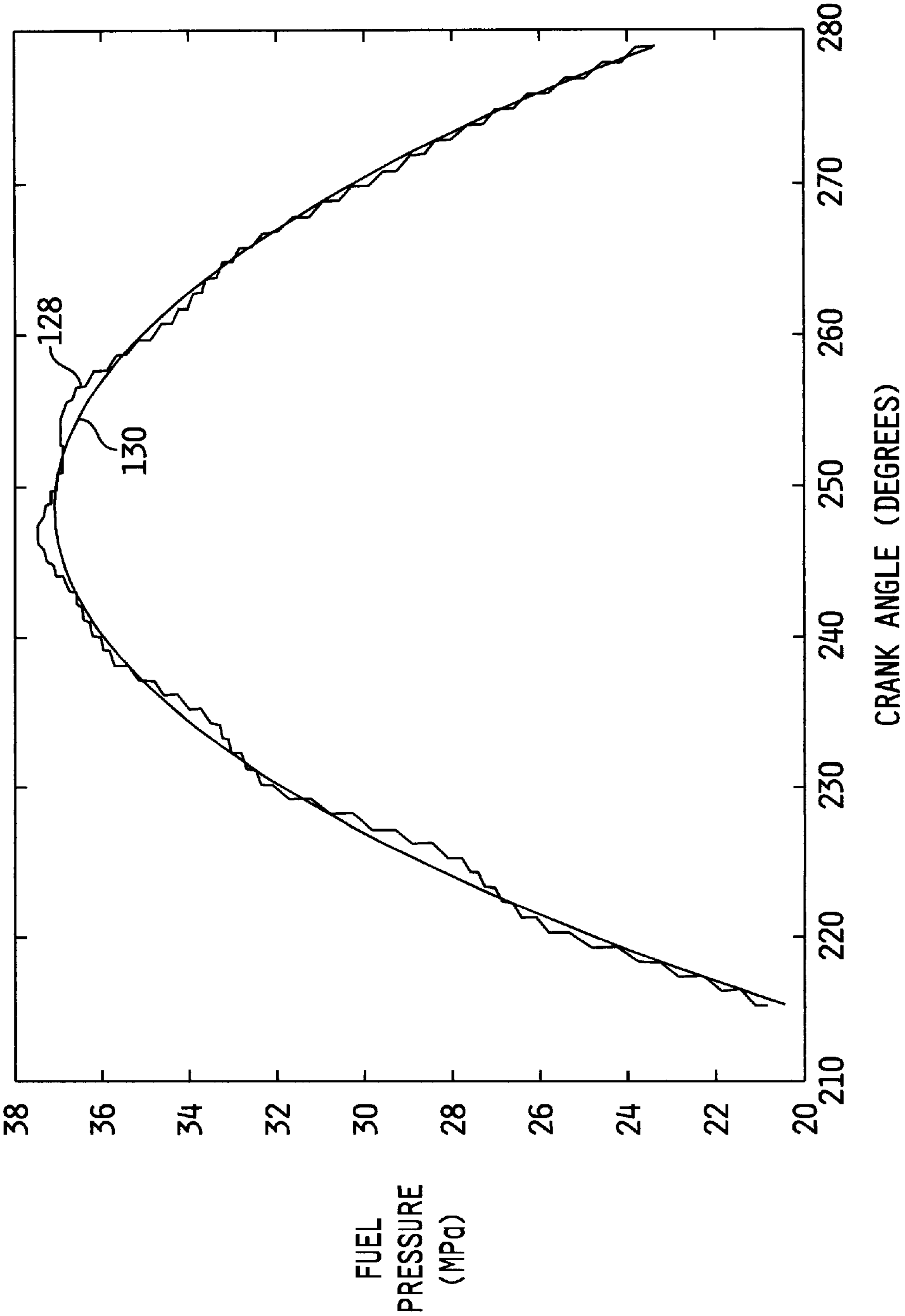
FIG. 6 is a plot of one of the fuel pressure peaks of FIG. 4 with a curve-fitted estimate thereof superimposed thereon.

In either case, the present invention contemplates a number of techniques for determining the peak pressure value in step 114. In one embodiment of step 114, for example, control circuit 68 is operable to sample an appropriate pressure signal as described above, as well as engine position, preferably in terms of crank angle relative to a predefined engine position (e.g., top-dead-center or TDC position of the cylinder/combustion chamber in question) via engine speed/position sensor 76, and compute an estimating function relating the two parameters. As one example, control circuit 68 may be operable at step 114 to determine a second order curve fitting equation such as $y=a+bx+cX^2$, wherein y=pressure samples, x=engine position samples, and a, b and c represent curve fit coefficients, and wherein control circuit 68 is preferably operable to determine the coefficients a, b and c according to a known recursive or non-recursive least-squares curve fitting technique. It has been determined through experimentation that sampling the pressure waveform throughout a 90 crank degree window with a two crank degree sampling interval, for example, provides for acceptable parameter identification with the least squares technique. For example, referring to FIG. 6, a plot of fuel pressure (e.g., provided by any of the pressure sensors 70, 96 or 100) vs. engine position 128 is shown along with an estimated fuel pressure function 130 superimposed over curve 128, wherein function 130 was determined in accordance with a second order curve fitting equation as just described. It is to be understood, however, that the present invention contemplates that other known functions may be used in place of the second order equation, and that other known techniques may be used in place of the recursive or non-recursive least squares technique for finding the function coefficients, and those skilled in the art will recognize that such alternate functions and/or curve fitting techniques are intended to fall within the scope of the present invention. Having determined an estimate of the pressure function in accordance with any of the foregoing techniques, control circuit 68 is thereafter operable to determine a peak point of the estimated pressure function by computing the first derivative of the estimation function, equating it to zero and solving for engine position [e.g., in the above example, dy/dx=b+2cx=0; x=−b/(2*c)].

As one alternative to the foregoing technique for executing step 114 of algorithm 110, control circuit 68 may be operable at step 114 to determine the peak pressure value by sampling an appropriate pressure signal as described above at a high sampling rate, and determining the peak pressure value (and corresponding engine position) as the zero slope point thereof according to well known techniques therefore. As another alternative, control circuit 68 may be operable at step 114 to determine the peak pressure value by computing two first-order linear equations to fit the data; one equation for pressure/engine position data prior to the peak and one equation for pressure/engine position after the peak, and determining the peak pressure value (and corresponding engine position) as the intersection point thereof. Those skilled in the art will recognize other known techniques for determining peak pressure values and corresponding engine positions for the monitored pressure and engine position signals, and that such other known techniques are intended to fall within the scope of the present invention.

Figure 4:
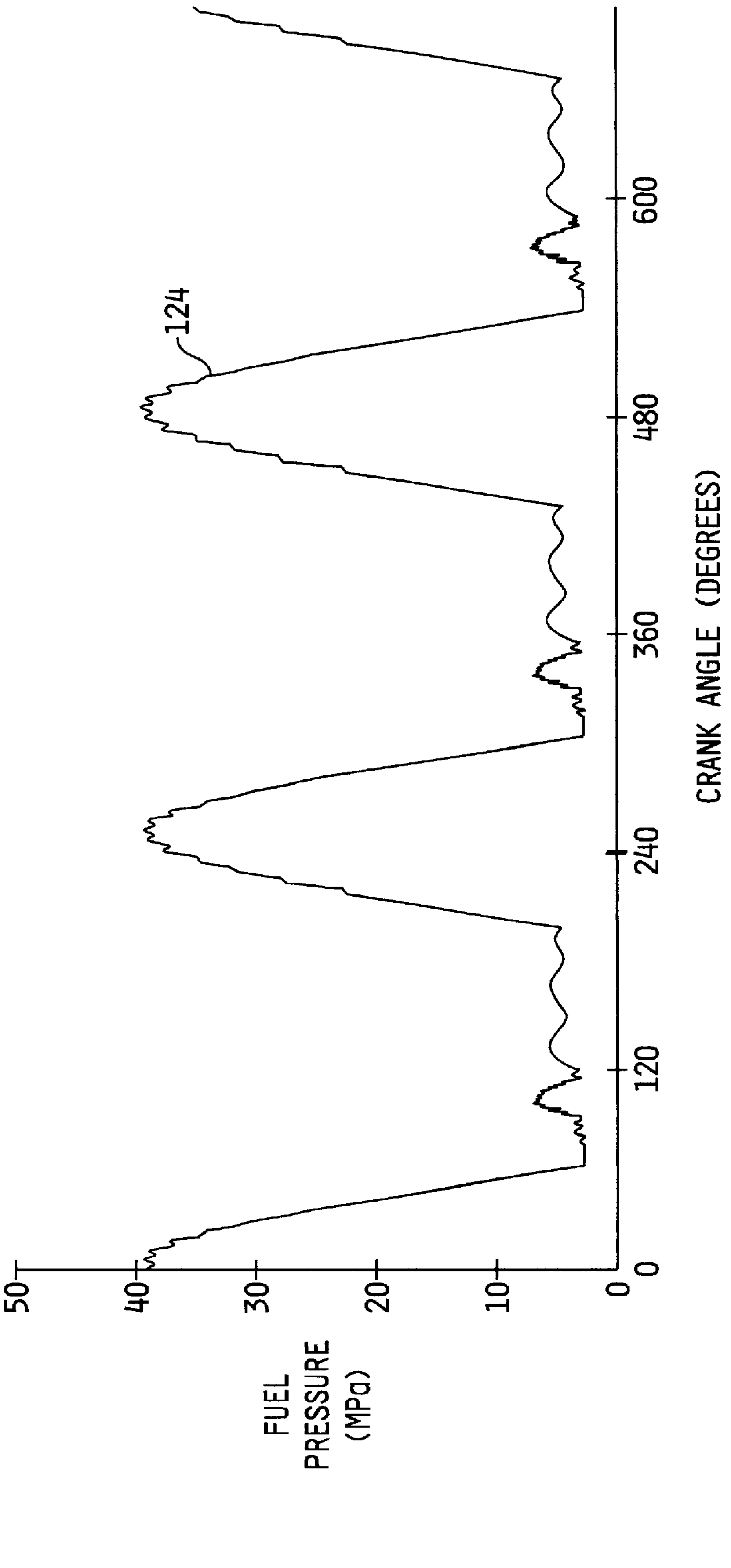
FIG. 4 is a plot of cyclic fuel pressure vs. crank angle during motoring conditions illustrating the general shape of the fuel pressure peaks under such operating conditions.
Figure 5:
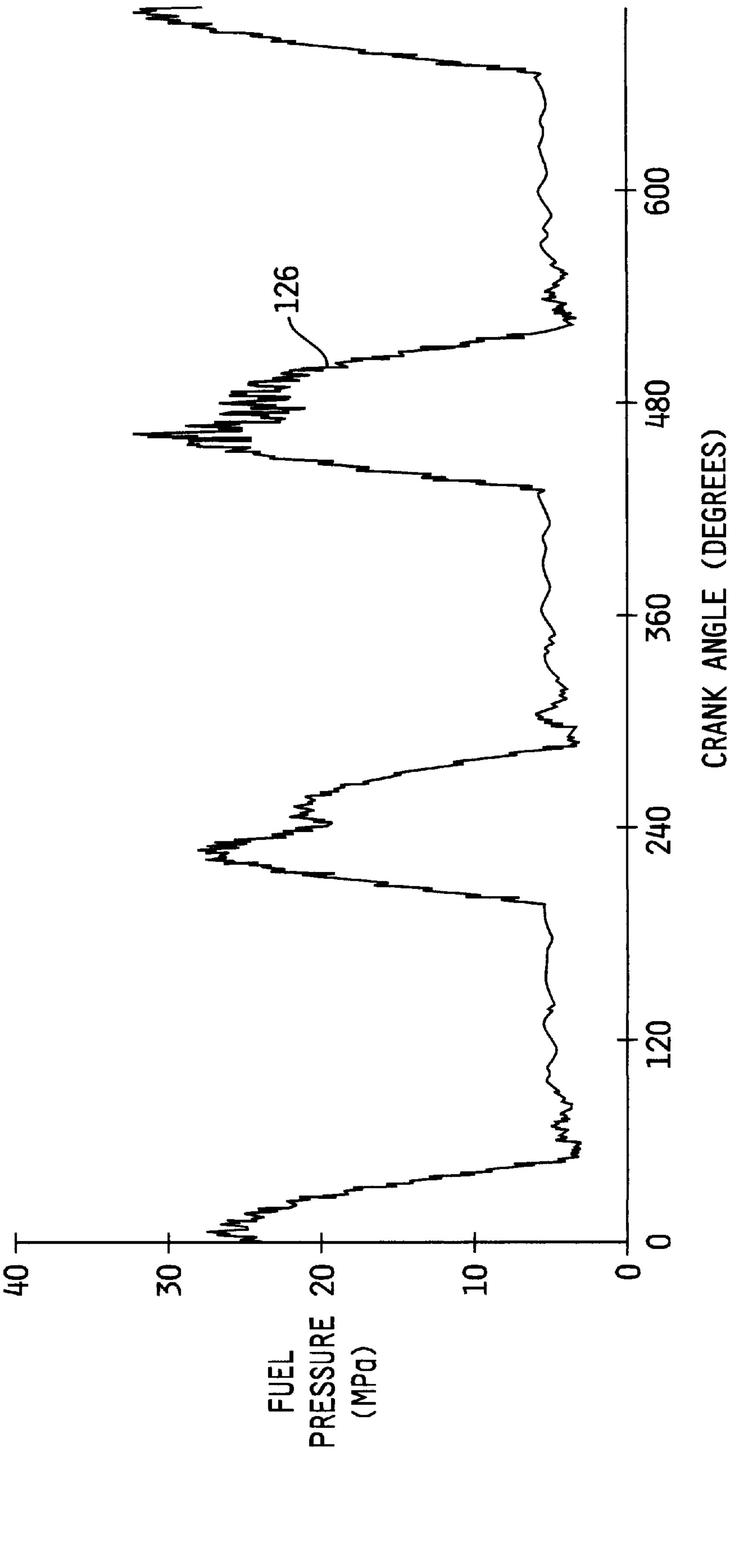
FIG. 5 is a plot of cyclic fuel pressure vs. crank angle during positive fueling conditions illustrating the shape of the fuel pressure peaks in contrast to those of FIG. 4.

Regardless of the technique used in step 114 for determining pressure peak and corresponding engine position values, sampling of an appropriate pressure signal, as described hereinabove, and the engine position signal is preferably carried out during motoring conditions; i.e., engine and vehicle speed greater than zero under zero fueling conditions. Under such conditions, as illustrated in FIG. 4, the pressure signal 124 (e.g., here the fuel pressure signal provided by pressure sensor 70, 96 or 100) is substantially sinusoidal about the peak pressures. By contrast, as illustrated in FIG. 5, the pressure signal 126 (e.g., here also the fuel pressure signal provided by pressure sensor 70, 96 or 100) under positive fueling conditions (e.g., here 125 $mm^3$/stroke) is not sinusoidal about the pressure peaks, and determination of the peak pressure values is accordingly more difficult, particularly by using any of the simpler known curve-fitting techniques. Those skilled in the art will recognize, however, that such signal sampling only during motoring conditions is not strictly required, particularly when using non curve-fitting techniques for determining peak pressure values, and that the scope of the present invention accordingly includes sampling appropriate pressure and engine position signals during non-motoring conditions.

In any case, execution of algorithm 110 advances from step 114 to step 116 where control circuit 68 is operable to determine a peak pressure value and corresponding engine position at a second engine speed E2 different from engine speed E1. In accordance with the present invention, control circuit 68 is operable at step 116 to determine the peak pressure value and corresponding engine position at E2 in accordance with any of the techniques described hereinabove with respect to the execution of step 114. In executing steps 114 and 116, the monitored pressure signal, as this term is defined hereinabove, is preferably sampled and processed to determine pressure peaks as described hereinabove during steady state engine operating conditions during motoring at a first engine speed (step 114). At a second engine speed that is preferably displaced from the first engine speed by at least a desired speed amount, the monitored pressure signal is again sampled and processed to determine pressure peaks thereat as described hereinabove (step 116). The first and second engine speeds may, in accordance with the present invention, occur during the same or different vehicle motoring events. Alternatively, control circuit 68 may be configured to sample the monitored pressure signal during any and/or all vehicle motoring events, and subsequently process such information that was collected at sufficiently different engine speeds to provide the peak pressure information. Generally, such data taken at more than two engine speeds tends to improve accuracy, decrease noise and facilitate the ability to estimate errors associated with the calculations.

From step 116, the execution of algorithm 110 advances, in one embodiment, to step 118 where control circuit 68 is operable to calculate the overall system bandwidth and combined engine static timing and fuel pump phasing errors as a function of the pairs of peak pressure values and corresponding engine position values determined at steps 114 and 116. This particular embodiment is applicable to systems such as system 50 of FIG. 1A and system 50' of FIG. 1B, wherein the peak pressure values determined in steps 114 and 116 correspond to fuel pressure peak values based on fuel pressure signals provided by sensor 70, 96 or 100. At step 118, control circuit 68 is operable to determine the distances between the engine positions at which the peak pressure points occurred at steps 114 and 116 and a reference engine position. In one embodiment, the reference engine position corresponds to an engine position at which a top-dead-center (TDC) position of fuel pump 54 occurs. For example, in one known fuel control system, fuel pump TDC is designed to occur 20 crank degrees after engine TDC, and in this case, the reference engine position at step 118 corresponds to engine TDC+20 crank degrees. In this embodiment, control circuit 68 is operable to determine a pair of offset values offset1 and offset2, wherein offset1 corresponds to a difference between the engine position at which peak pressure occurs for engine speed ES1 (step 114) and the reference engine position, and offset2 corresponds to a difference between the engine position at which peak pressure occurs for engine speed ES2 (step 116) and the reference engine position. Those skilled in the art will recognize that any engine reference position may be used in step 118 as long as this engine reference position is subsequently related to an engine position at which fuel pump TDC occurs in the calculation of offset1 and offset2, and that such other reference engine positions are intended to fall within the scope of the present invention.

In any case, if the overall system bandwidth is infinite, and assuming negligible hydraulic line delay, and further assuming that the fuel pump 54 and engine position sensor are perfectly aligned, then the offset values offset1 and offset2 will be zero. However, due to factors contributing to a finite overall system bandwidth, and due to the possibility of engine static timing and/or fuel pump phasing errors, the peak pressure values determined at steps 114 and 116 may not occur at the same engine positions as the reference engine position. In accordance with the present invention, the offset values determined at step 118 are thus related to the engine static timing and fuel pump phasing errors as well as a combined hydro-mechanical system phase delay and sensor phase delay (hereinafter referred to collectively as "phase lag") according to the equation:

$$\text{Offset}=(\text{engine static timing error}+\text{fuel pump phase error})+\text{phase lag} \quad (1),$$

wherein the engine static timing error and fuel pump phase error represent a fixed, constant error value (hereinafter "ERR") at all operating conditions of a given engine. In the foregoing equation, the phase lag varies with input signal frequency of the pressure signal and the overall system bandwidth, and in one known fuel system, the frequency of the pressure signal (in units of Hz) is, for example, $1/40^{th}$ of the engine speed (in units of RPM). The phase lag thus varies with system bandwidth and engine speed. Those skilled in the art will recognize that other systems may exhibit different relationships between pressure and engine speed, and that such different relationships may be substituted into equation (1) as required. In any case, the phase lag term in the foregoing equation is preferably modeled as a function of the bandwidth of the overall system and of the frequency of the pressure signal provided by any of sensors 70, 96 or 100. For example, in one embodiment, the overall system frequency response is modeled in accordance with an ideal first order linear dynamic system, such that the phase lag may be represented by the equation:

$$\text{phase lag (in crank degrees)}=\arctan(W/W_P)/K \qquad (2),$$

wherein W is the known frequency (Hz) of the pressure signal (e.g., engine speed/40), $W_P$ (in units of Hz) is the bandwidth of the overall system, and K represents a ratio of fuel pump speed to engine speed (e.g., K=1.5 in one embodiment), and is therefore a known constant. Substituting equation (2) into equation (1), and duplicating the equation for the two offset values offset1 and offset2, leads to the following system of equations:

$$\text{Offset1}=\text{ERR}+\arctan(W_1/W_P)/K$$

$$\text{Offset2}=\text{ERR}+\arctan(W_2/W_P)/K \qquad (3),$$

wherein $W_1$ and $W_2$ (both in units of Hz) are related to engine speed values ES1 and ES2 (both in units of RPM) such as by the example given above (e.g., $W_1$=ES1/40 and $W_2$=ES2/40). Returning again to FIG. 2, control circuit 68 is thus operable to complete step 118 by solving the two equations (3) for the two unknowns (ERR and $W_P$).

In an alternative embodiment of algorithm 110, step 116 advances to step 120 (shown in phantom) rather than to step 118 where control circuit 68 is operable to calculate the overall system bandwidth and the engine static timing error as a function of the pairs of peak pressure values and corresponding engine position values determined at steps 114 and 116. This particular embodiment is applicable to systems such as system 50" of FIG. 1C wherein the peak pressure values determined in steps 114 and 116 correspond to cylinder (i.e., combustion chamber) pressure peak values based on pressure signals provided by sensor 106. In such a case, as described hereinabove, by using cylinder pressure in the above equations, fuel pump phasing errors do not enter into the offset calculations and an engine static timing error alone can thus be determined. Control circuit 68 is preferably operable to execute step 120 in an identical manner to that described hereinabove with respect to step 118, except that ERR=engine static timing only. Accordingly, the system of equations (3) become:

$$\text{Offset1}=\text{engine static timing error}+\arctan(W_1/W_P)/K$$

$$\text{Offset2}=\text{engine static timing error}+\arctan(W_2/W_P)/K, \qquad (4).$$

Control circuit 68 is operable at step 120 to solve equation (4) for the two unknowns $W_P$ and engine static timing error.

It is to be understood that although equations (3) and (4) are described as based on a first-order model having two equations and two unknowns, the present invention contemplates alternatively defining equations (3) and/or (4) in accordance with other system models. For example, equations (3) and (4) may be defined as any desired multiple-order model (i.e., a "Nth" order model in general), wherein the monitored pressure must typically be sampled and processed for at least N+1 different engine speeds. As another example, equations (3) and (4) may be defined in accordance with a simple linear function. Such alternative system models are intended to fall within the scope of the present invention.

Figure 7:
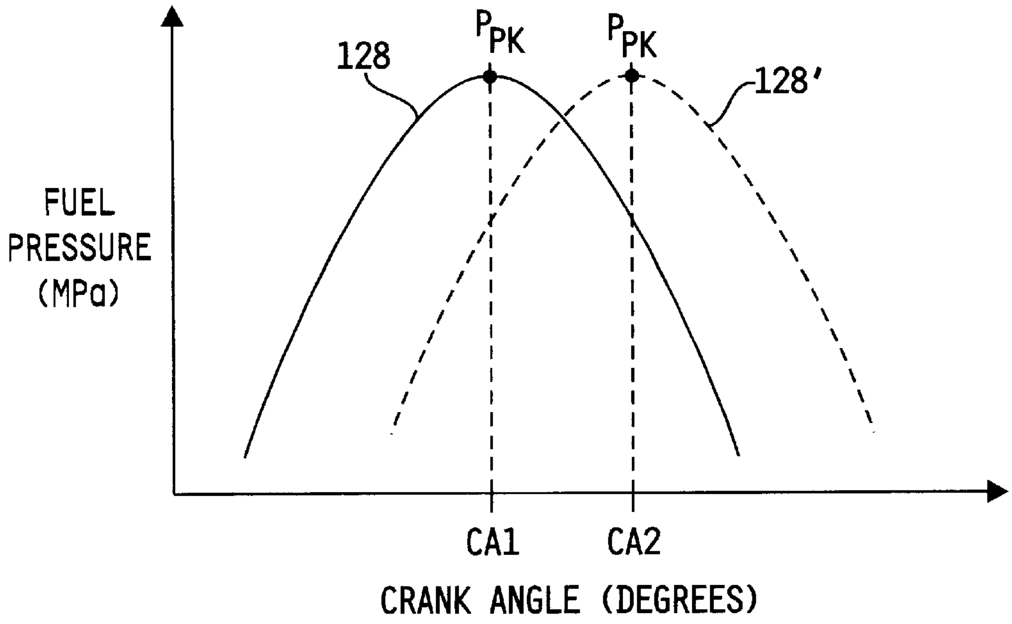
FIG. 7 is a plot of one of the fuel pressure waveforms of FIG. 4 illustrating an offset in the waveform due to a limitation in the overall system bandwidth.

Referring now to FIG. 7, one example of a monitored pressure sampling error associated with a limited overall system bandwidth is illustrated. Assuming for the purpose of FIG. 7 that value ERR in either of equations (3) or (4) is zero, fuel pressure waveform 128 represents an actual fuel pressure waveform having a peak pressure value $P_{PK}$ that occurs at a crank angle CA1. If the system bandwidth $W_P$ is infinite, a conventional pressure sampling algorithm will correctly determine the peak pressure value as $P_{PK}$ occurring at a crank angle of CA1. However, if the overall system bandwidth is not infinite but is instead some finite value, the pressure waveform 128 will be shifted or offset with respect to crank angle as shown by the phantom pressure waveform 128', wherein the amount of shift or offset is a function of bandwidth and engine speed. In this case, a conventional pressure sampling algorithm will determine the peak pressure value $P_{PK}$ as occurring at crank angle CA2. If ERR=zero and $W_P$ is determined according to equation (3) or (4), the Offset value of equation (1) may be determined at any engine speed as a function of the computed overall system bandwidth. This Offset value of equation (1) may then be used in a conventional pressure sampling algorithm, in accordance with the present invention, to appropriately shift the sampling timing and thereby compensate for the offset in crank angle reading at any engine speed. In this way, an overall system bandwidth $W_P$ less than infinity (e.g., a limited system bandwidth) can be compensated for in a conventional pressure sampling algorithm so that the peak pressure value $P_{PK}$ may be correctly matched with crank angle CA1.

Figure 8:
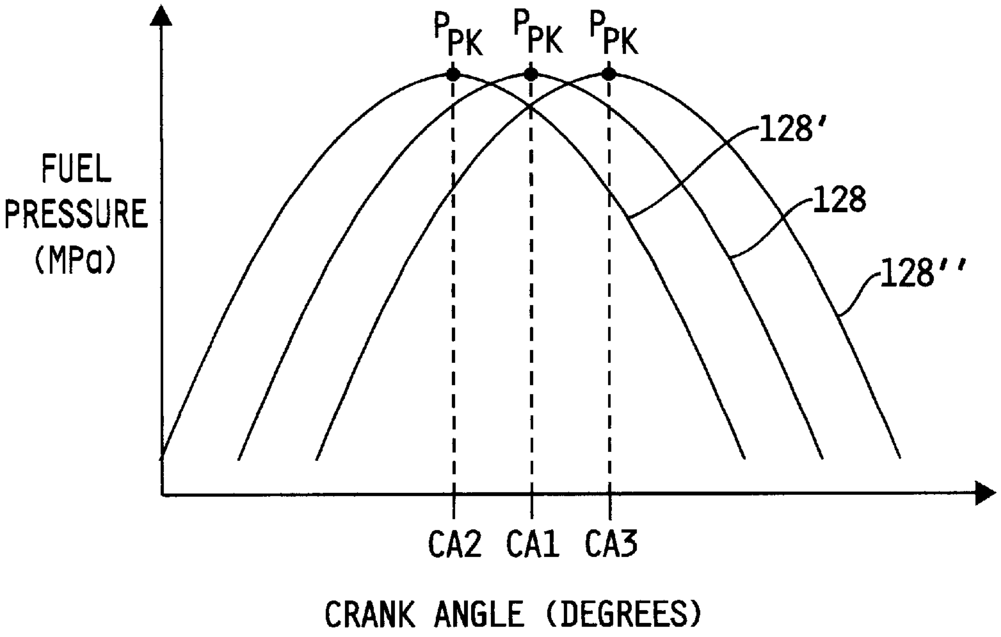
FIG. 8 is a plot of three of the fuel pressure waveforms of FIG. 4, each representative of a separate physical engine of the same type, illustrating potential offsets in the peak pressure measurements thereof due to corresponding variations in engine static timing and fuel pump phasing.

Referring now to FIG. 8, an example of a monitored pressure sampling error associated with a combined engine static timing and fuel pump phasing error (e.g., system 50 or 50') or with an engine static timing error alone (e.g., system 50") is illustrated. Assuming for the purpose of FIG. 8 that the overall system bandwidth Wp is infinite in either of equations (3) or (4), and that fuel pressure waveform 128 represents a fuel pressure waveform of an actual engine having a peak pressure value $P_{PK}$ that occurs at a nominal crank angle CA1. If the error value ERR is zero in equations (3) or (4) for a different engine, a conventional pressure sampling algorithm will determine the pressure value $P_{PK}$ as occurring at crank angle of CA1. However, if the combined engine static timing and fuel pump phasing error (system 50 or 50') or the engine static timing error alone (system 50") is non-zero, a conventional pressure sampling algorithm will observe a crank angle shift as a result of this error and therefore determine the peak pressure value as $P_{PK}$ as occurring at a different crank angle. For example, for an engine exhibiting pressure waveform 128', a conventional pressure sampling algorithm will determine the pressure peak $P_{PK}$ as occurring at a crank angle CA2 that is less than CA1, and for another engine exhibiting pressure waveform 128", a conventional pressure sampling algorithm will determine the pressure peak $P_{PK}$ as occurring at a crank angle CA3 that is greater than CA1. In each case, the shift or offset in crank angle at which peak pressure $P_{PK}$ occurs a function of ERR alone and is therefore fixed for a fixed ERR value for any particular engine. If $W_P$ is infinite, then the Offset value of equation (1) may be determined strictly as a function of ERR (e.g., engine static timing error with or without a fuel pump phasing error contribution). This Offset value of equation (1) may then be used in a conventional pressure sampling algorithm, in accordance with the present invention, to appropriately shift the sampling timing and thereby compensate for the offset in crank angle and peak pressure reading. In this way, an engine static timing error with or without an additional fuel pump phasing error contribution can be compensated for in a conventional pressure sampling algorithm so that errors attributable to between-engine variations in the peak pressure value $P_{PK}$ and corresponding crank angle relationship can be eliminated or at least minimized.

From either of steps 118 or 120, the execution of algorithm 110 advances to step 122 where control computer 68 is operable to direct the error values determined at step 118 or step 120 to one or more appropriate engine control algorithms. As one example of step 122, engine static timing errors are known to cause between-engine variations in start-of-injection (SOI) in many fuel control systems for internal combustion engines. Reducing and even minimizing the impact of such engine static timing errors would, in turn, reduce SOI variations and correspondingly provide for improved emissions and fuel economy. In accordance with one aspect of the present invention, step 122 may thus correspond to providing the engine static timing error value (in cases where this error value is available by itself) to a fuel control system to thereby reduce between-engine SOI variations by more closely matching timing relationships between engine position and other fuel system parameters such as fuel pressure, fuel pump actuator commands, and the like, as described to hereinabove with respect to FIG. 8.

Figure 9:
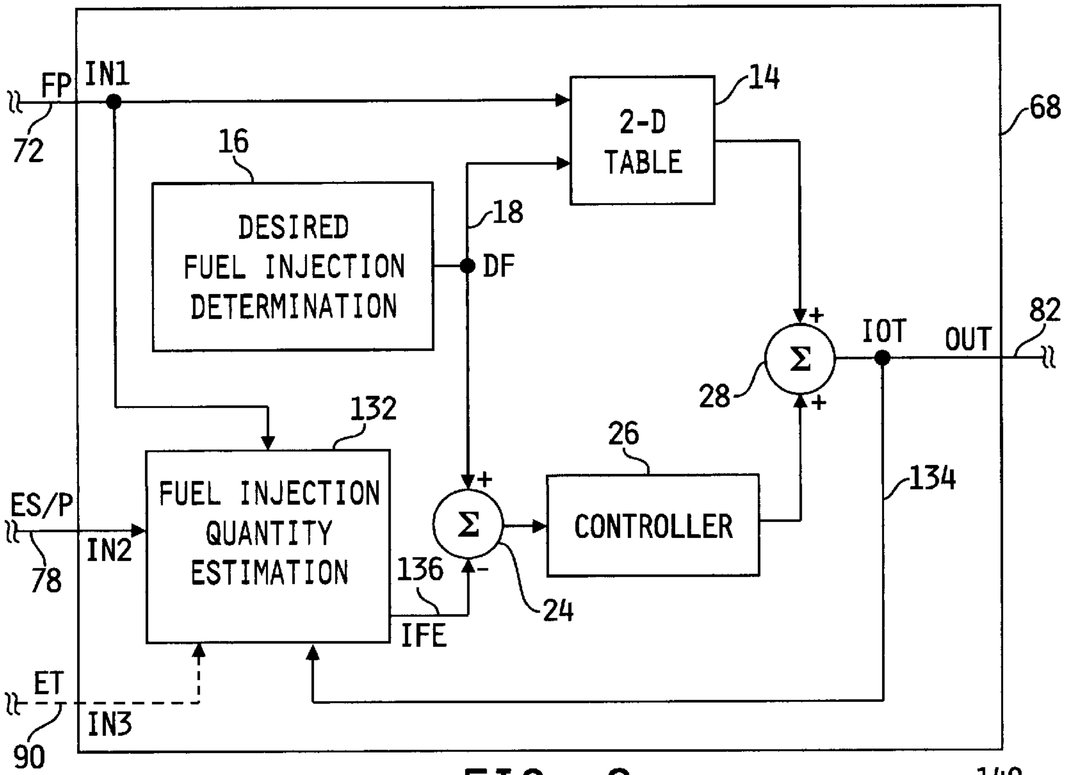
FIG. 9 is a diagrammatic illustration of one preferred application of the concepts of the present invention as they relate to a fuel control strategy including a closed-loop fuel injection quantity estimation technique.
Figure 11:
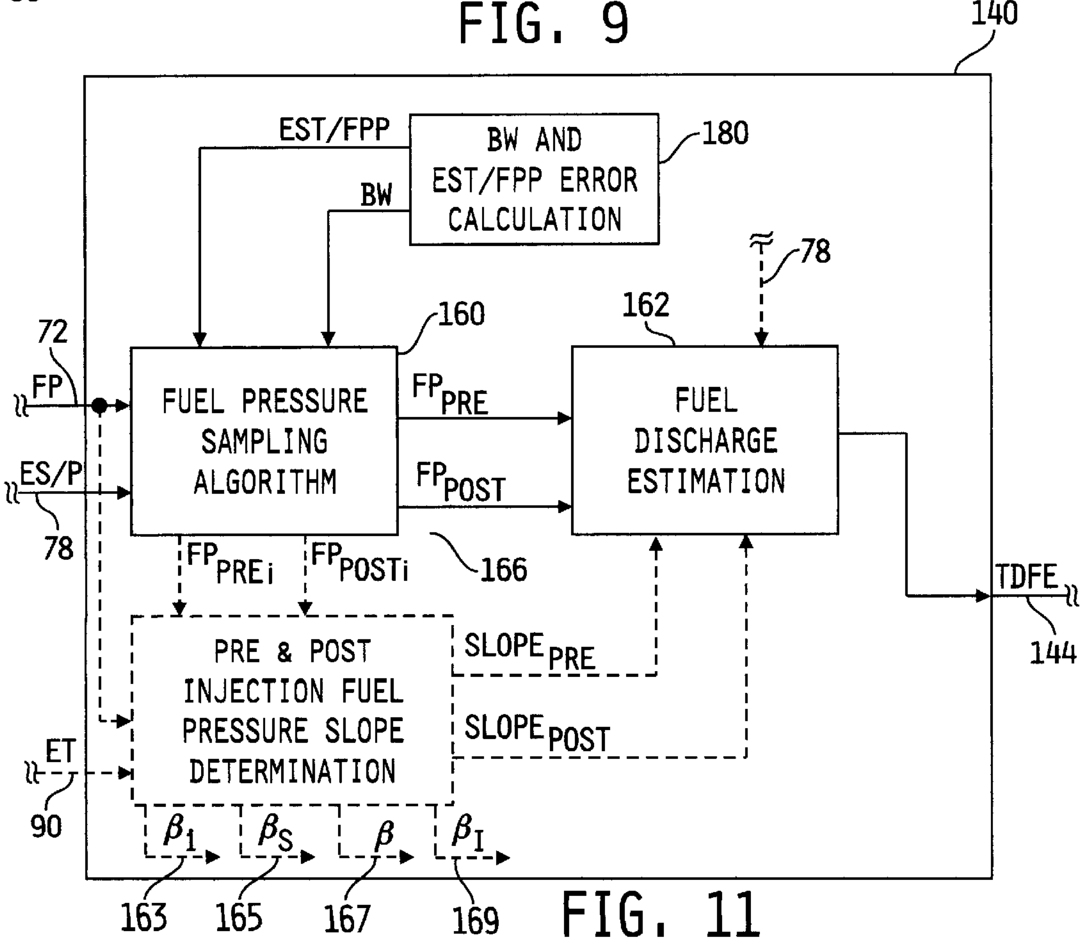
FIG. 11 is a diagrammatic illustration of one preferred embodiment of the total discharged fuel estimate block of FIG. 10 including a bandwidth error and engine static timing/fuel pump phasing error minimization control technique, in accordance with the present invention.
Figure 10:
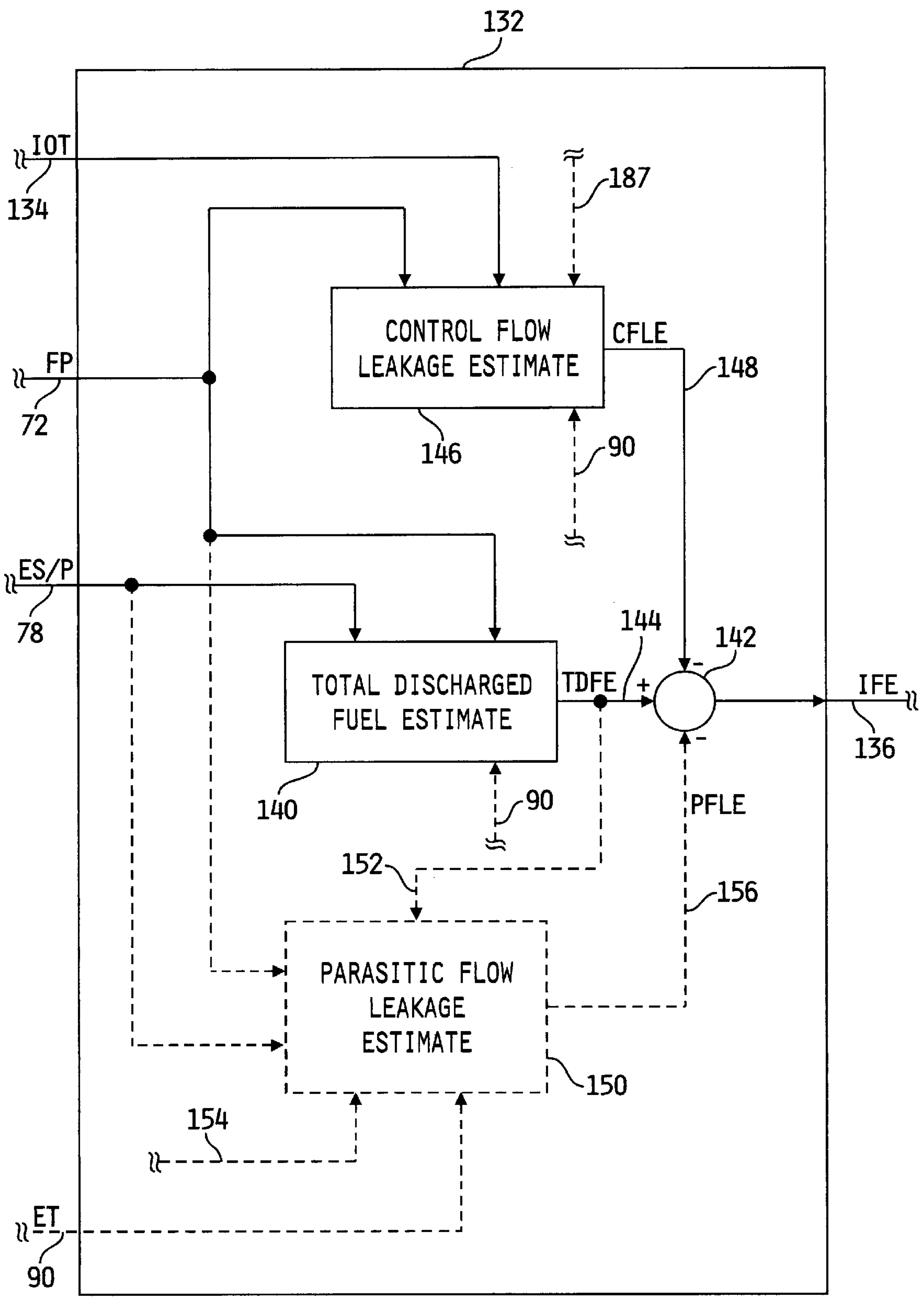
FIG. 10 is a diagrammatic illustration of one preferred embodiment of the fuel injection quantity estimation block of FIG. 9.

As another example of step 122, the combined engine static timing and pump phasing error as well as the bandwidth error have been observed to cause between-engine variations in systems for determining fuel injection quantities. One such system for determining fuel injection quantities is set forth in detail in co-pending U.S. application Ser. No. 09/565,010, entitled Fuel Control System Including Adaptive Injected Fuel Quantity Estimation, the disclosure of which is incorporated herein by reference. Referring to FIGS. 9–11, some of the details of the foregoing system, as they relate to the present invention, are shown. As part of the Fuel Control System Including Adaptive Injected Fuel Quantity Estimation application described above, the control computer 68 of FIGS. 1A or 1B may include the control strategy set forth in FIG. 9, wherein block 132 is configured to receive a fuel pressure signal (FP) via signal path 72, an engine speed and position signal (ES/P) via signal path 78 and a commanded fuel signal (in terms of an injector on-time signal IOT produced by control circuit 68 on signal path 82) via signal path 134. Optionally, fuel injection quantity estimation block 132 may additionally receive an engine temperature signal via signal path 90. An injected fuel estimate (IFE) value is produced by fuel injection quantity estimation block 132 and is directed to a subtractive input of summing node 24 via signal path 136. The fuel injection quantity estimation block 132 thus serves as a virtual sensor operable to determine injected fuel quantities based on certain engine and fuel system related operational parameters.

In the operation of the portion of control circuit 68 illustrated in FIG. 9, two-dimensional look-up table 14 receives a fuel pressure signal (FP) via signal line 72 and a desired fuel injection quantity value (DF) from process block 16 via signal path 18. Table 14 is responsive to the fuel pressure signal and the desired fuel injection quantity value to produce an initial fueling command as is known in the art. The fuel injection estimation block 132 is responsive to at least the fuel pressure signal (FP) on signal path 72, the engine speed/position signal (ES/P) on signal path 78 and the fueling command signal (injector on-time signal IOT) on signal path 134 to estimate an injected fuel quantity and supply a corresponding injected fuel quantity estimate (IFE) to a subtractive input of summing node 24 via signal path 136. Node 24 produces an error value as a difference between the desired fuel injection quantity (DF) and the injected fuel quantity estimate (IFE) and applies this error value to a controller 26. Controller 26 is responsive to the error value to determine a fuel quantity adjustment value, wherein the initial fueling command and the fuel quantity adjustment value are applied to additive inputs of a second summing node 28. The output of summing node 28 is an output 82 of control circuit 68 that represents a final fueling command, wherein the final fueling command is the initial fueling command produced by table 14 adjusted by the fuel quantity adjustment value produced by controller 26.

Referring now to FIG. 10, an embodiment of the fuel injection quantity estimation block 132 of FIG. 9 is shown. Block 132 includes a total discharged fuel estimate block 140 receiving the fuel pressure signal (FP) via signal path 72 and the engine speed/position signal (ES/P) via signal path 78. Optionally, as shown in phantom in FIG. 10, block 140 may be configured to receive the engine or fuel temperature signal (ET) via signal path 90. In any case, block 140 is operable, as will be more fully described hereinafter, to process at least the fuel pressure (FP) and engine speed/position (ES/P) signals and produce a total discharged fuel estimate value (TDFE) on signal path 144 corresponding to an amount of pressurized fuel removed from the fuel collection unit 56 pursuant to a fuel injection event.

Fuel injector control actuator 80 of fuel injector 60 is controlled by control circuit 68 to direct or spill at least some of the pressurized fuel supplied by fuel collection unit 56 to fuel injector 60 back to fuel supply 52 via a hydraulic path or fuel passageway 81 in order to cause an actual fuel injection event to occur, as is known in the art. In such cases, the fuel injection quantity estimation block 132 of the present invention accordingly includes a control flow leakage estimate block 146 operable to estimate such a fuel spill amount, as will be described more fully hereinafter, so that the fuel spill amount can be subtracted from the total discharged fuel estimate value (TDF) in determining the injected fuel estimate (IFE). The fuel pressure signal (FP) on signal path 72 and the final fueling command (in terms of injector on-time IOT) on signal path 134 are provided to the control flow leakage estimate block 146 which is operable to process these signals and produce a control flow leakage estimate value (CFLE) on signal path 148. Optionally, as shown in phantom in FIG. 5, one or more additional signals may be supplied to block 146 via signal path 187, wherein block 146 is operable to process such signals along with the IOT and FP signals to produce the control flow leakage estimate (CFLE). Examples of signals available on signal path 187 include, but are not limited to, engine speed/position, engine timing, and the like. As a further option, block 146 may be configured to receive the engine or fuel temperature signal (ET) via signal path 90. In any case, signal path 144 is supplied to an additive input of a summing node 142, and signal path 148 is supplied to a subtractive input of summing node 142. An output of summing node 142 forms the output 136 of the fuel injection quantity estimation block 132 and accordingly carries the injected fuel estimate value (IFE).

Those skilled in the art will recognize that the control flow leakage estimate block 146 is necessarily included in fuel systems having so-called indirect control (e.g., injectors defining a hydraulic link between the injector inlet port and outlet drain) over fuel injector delivery time or "on-time" as this term is used herein. Conversely, it should also be recognized that fuel systems are known that include structure providing for direct control over fuel injector delivery time or on-time. In these types of fuel systems, spill valves of the type just described are therefore unnecessary and no control flow exists to create an actual injection event. In such systems, the control flow leakage estimate block 146 can therefore be omitted.

Optionally, as shown in phantom in FIG. 10, the fuel injection quantity estimation block 132 may include a parasitic flow leakage estimate block 150 receiving the fuel pressure signal (FP) and engine speed/position signal (ES/P) via signal paths 72 and 78, respectively. Additionally, block 150 receives an engine temperature signal (ET) via signal path 90 and the total discharged fuel estimate value TDFE on signal path 144 via signal path 152. Finally, block 150 may be configured to receive one or more additional signals via signal path 154 as will be more fully described hereinafter. The parasitic flow leakage estimate block 150 is operable to process the foregoing information and produce a parasitic flow leakage estimate (PFLE) on signal path 156 which is supplied to a subtractive input of summing node 142. The injected fuel estimate (IFE) of block 132 is, in this case, is the total discharged fuel estimate (TDFE) minus the control flow leakage estimate (CFLE) and the parasitic flow leakage estimate (PFLE).

In some fueling systems, the parasitic leakage on the injected fuel and quantity estimate (IFE) may be negligible. In other systems, non-negligible parasitic leakage levels may be minimized by reading pre- and post-injection fuel pressure values very close to the injection event itself. In any such fuel system embodiments wherein such parasitic leakage may be negligible, the parasitic flow leakage estimate block 150 may be omitted from the fuel injection quantity estimation block 132, with the injected fuel estimate (IFE) then being computed as a difference between the total discharged fuel estimate (TDFE) and the control flow leakage estimate (CFLE) in fuel systems having a control flow of fuel as described above, or simply as the total discharged fuel estimate (TDFE) in fuel systems having no control flow. In other fuel systems, the parasitic flow leakage estimate (PFLE) may contribute significantly to the injected fuel estimate (IFE), in which case the parasitic flow leakage estimate block 150 should be included for accuracy. In any case, preferred embodiments and operation of the parasitic flow leakage estimate block 150 will be more fully described hereinafter.

Referring now to FIG. 11, one preferred embodiment of the total discharged fuel estimate block 140 of FIG. 10, in accordance with the present invention, is shown. Block 140 includes a fuel pressure sampling algorithm 160 that is responsive to the fuel pressure signal (FP) on signal path 72 and the engine speed/position signal (ES/P) on signal path 78 to sample fuel pressure across a fuel injection event and produce a pre-injection fuel pressure value ($FP_{PRE}$) and a post-injection fuel pressure ($FP_{POST}$). The fuel pressure sampling algorithm 160 is operable to compute $FP_{PRE}$ and $FP_{POST}$ as average fuel pressures over predefined crank angle windows relative to crank TDC. For example, in one embodiment algorithm 160 is operable to sample the fuel pressure signal on signal path 72 every 2 degrees of crank angle, and to compute $FP_{PRE}$ as the average of eight fuel pressure values between −30 to −16 crank angle degrees prior to cylinder TDC, and $FP_{POST}$ as the average of eight fuel pressure values between 46 and 60 crank degrees after cylinder TDC. It is to be understood, however, that other sampling ranges of any desired crank angle window can be used to provide the pre- and post-injection fuel pressure values $FP_{PRE}$ and $FP_{POST}$, respectively.

Block 140 further includes, in accordance with the present invention, a bandwidth and engine static timing/fuel pump phasing error calculation block 180 providing the engine static timing and fuel pump phasing error value EST/FPP (i.e., the ERR value of equations (1)–(3)) and bandwidth value BW (i.e., the $W_P$ value) of equations (2)–(3)) to the fuel pressure sampling algorithm 160. Block 180 is operable to compute the engine static timing/fuel pump phasing error value EST/FPP and bandwidth value BW, as described hereinabove, and provide these error values to algorithm 160 to improve the accuracy of the fuel pressure sampling algorithm. For example, these error values may be used, in a known manner, to improve the timing of the fuel pressure sample values relative to engine position; i.e., to more accurately match fuel pressure samples with crank angle values, than was otherwise possible with algorithm 160 alone, examples of which are described hereinabove with respect to FIGS. 7 and 8. Doing so provides for more accurate and consistent between-engine fuel pressure sampling behavior, and therefore provides for improved accuracy of the fuel injection quantity estimation block 132 as a whole.

The total discharged fuel estimate block 140 further includes a fuel discharge estimation block 162 operable to produce a total discharged fuel estimate (TDFE) on signal path 144 based on the pre- and post-injection fuel pressure values $FP_{PRE}$ and $FP_{POST}$. Block 162 preferably comprises a regression equation that produces the total discharged fuel estimate (TDFE) as a function of $F_{PRE}$ and of $FP_{POST}$. For example, in this embodiment, the total discharged fuel estimate value (TDFE) is computed by block 162 in accordance with the equation $TDFE=a+b*FP_{PRE}+c*FP_{PRE}*FP_{PRE}+d*FP_{POST}+e*FP_{POST}*FP_{POST}+f*ES/P$, wherein a–f are regression parameters. Those skilled in the art will recognize that the foregoing regression equation parameters for estimating the total discharged fuel based at least on fuel pressure values may be determined using known and common curve-fitting techniques, and that other curve-fitting equations, model-based equations or other desired equations that are a function of at least $FP_{PRE}$ and $FP_{POST}$ may be substituted for the foregoing regression equation for determining TDFE, and that such alternate equations are intended to fall within the scope of the present invention. Examples of other curve-fitting techniques, for example, include, but are not limited to, least squares data-fitting techniques, and the like. In any case, signal path 144 is the output of block 162 and carries the total discharged fuel estimate (TDFE) produced by block 140.

In an alternative embodiment, the total discharged fuel estimate block 140 may be configured to include as part of the total discharged fuel estimate (TDFE) effects thereon of changes in the bulk modulus of the fuel contained in the fuel collection unit (as this term is defined hereinabove). For example, the relationship between energy stored in the fuel collection unit and the change in fuel volume is known to be dependent upon the effective bulk modulus of the system. An estimate of the effective bulk modulus of the fuel system may thus be used to improve the total discharged fuel estimate (TDFE) of block 140, and block 140 may therefore optionally include a pre- and post-injection fuel pressure slope determination block 166 receiving the individual pre-injection fuel pressure values $FP_{PREi}$ and individual post-injection fuel pressure values $FP_{POSTi}$ from the fuel pressure sampling algorithm 160. Optionally, as shown in phantom, block 166 may be configured to receive the engine or fuel temperature signal (ET) via signal path 90. In any case, block 166 is operable to determine in accordance with well-known equations, the slope of the pre-injection fuel pressure signal during the predefined crank angle window ($SLOPE_{PRE}$) and the post-injection slope of the fuel pressure signal during the predefined crank angle window ($SLOPE_{POST}$), respectively. The fuel pressure slope values are then provided to the fuel discharge estimation block 162 wherein block 162 is configured, in this embodiment, to compute TDFE as a function of at least $FP_{PRE}$, $FP_{POST}$, $SOPE_{PRE}$ and $SLOPE_{POST}$. In one embodiment, for example, fuel discharge estimation block 163 is operable to compute the discharged fuel estimate TDFE in accordance with a regression equation of the type described hereinabove with respect to the previous embodiment of block 140, wherein at least the values $SLOPE_{PRE}$ and $SLOPE_{POST}$ are used in addition to the values $FP_{PRE}$ and $FP_{POST}$ (e.g., $TDFE=a+b*FP_{PRE}+c*FP_{PRE}*FP_{PRE}+d*FP_{POST}+e*FP_{POST}*FP_{POST}+f*SLOPE_{PRE}+g*SLOPE_{PRE}*SLOPE_{PRE}+h*SLOPE_{POST}+i*SLOPE_{POST}*SLOPE_{POST}+j*ES/P$, wherein a–j are regression parameters). As with the previously discussed embodiment of block 162, however, those skilled in the art will recognize that the foregoing equation represents a known and common curve-fitting technique, and that other curve-fitting equations, model-based equations or other desired equations that are a function of at least $FP_{PRE}$, $FP_{POST}$, $SLOPE_{PRE}$and $SLOPE_{POST}$ may be substituted for the foregoing regression equation for determining TDFE, and that such alternate equations are intended to fall within the scope of the present invention. Examples of other curve-fitting techniques, for example, include, but are not limited to, least squares data-fitting techniques, and the like. In any case, signal path 144 is the output of block 162 and carries the total discharged fuel estimate (TDFE) produced by block 140. Block 166 may additionally be configured to produce an instantaneous bulk modulus value $\beta_i$ on signal path 163 corresponding to the instantaneous bulk modulus of the pressurized fuel, a bulk modulus slope value $\beta_s$ on signal path 165 corresponding to a slope of the bulk modulus function over a range of fuel pressure values, a bulk modulus intercept value $\beta_I$ corresponding to a zero-pressure bulk modulus value of the bulk modulus function on signal path 169, and a bulk modulus function $\beta$.

Referring again to FIG. 2, the execution of algorithm 110 advances from step 122 to step 123 where algorithm 110 is returned to its calling routine. The present invention recognizes that the magnitudes of the engine static timing and fuel pump phasing errors as well as the overall system bandwidth depend upon many factors and may further vary over time as a function of, for example, climate, frequency of use, prolonged use, etc. Accordingly, algorithm 110 is preferably executed at least once per ignition cycle of the engine 66, although the present invention contemplates that algorithm 110 may alternatively be executed either more or less frequently as desired.

While the invention has been illustrated and described in detail in the foregoing drawings and description, the same is to be considered as illustrative and not restrictive in character, it being understood that only preferred embodiments thereof have been shown and described and that all changes and modifications that come within the spirit of the invention are desired to be protected. For example, the concepts of the present invention may be implemented as an on-line (real-time) technique in an operating vehicle, as an off-line service or diagnostic feature as part of normal vehicle/engine service, and/or as part of an engine test rig. Those skilled in the art will recognize other uses of the concepts of the present invention, and that such other uses are intended to fall within the scope of the present invention.

What is claimed is:

1. Apparatus for determining errors in monitored operating parameters of a fuel system for an internal combustion engine, comprising:

means for sensing a pressure associated with a fuel system of an internal combustion engine and producing a pressure signal corresponding thereto, said pressure signal having peak values corresponding to peak pressure values thereof;

means for determining a reference position of said internal combustion engine and producing a reference position signal corresponding thereto;

means for determining first and second engine positions at which peak values of said pressure signal occur for at least first and second engine speeds; and means for determining a first operating parameter error value as a function of said first and second engine positions relative to said reference engine position.

2. The apparatus of claim 1 further including means for correcting said pressure signal relative to said reference position signal based on said first and second operating parameter error values.

3. The apparatus of claim 1 further including means responsive to said pressure signal for determining peak pressures of said pressure signal and associated engine positions.

4. The apparatus of claim 3 further including means for sensing rotational speed of said engine and producing an engine speed signal corresponding thereto;

and wherein said means for determining first and second engine positions is responsive to said engine speed signal to determine said first engine position when said engine speed signal corresponds to said first engine speed and to determine said second engine position when said engine speed signal corresponds to said second engine speed.

5. The apparatus of claim 4 wherein said means for determining a reference position of said engine is operable to determine said reference position as an engine position corresponding to a top dead center (TDC) position associated with a fuel pump of said fuel system.

6. The apparatus of claim 1 wherein said means for determining a first operating parameter error value as a function of said first and second engine positions relative to said reference engine position is further operable to determine a second operating parameter error value also as a function of said first and second engine positions relative to said reference engine position.

7. The apparatus of claim 6 wherein said means for sensing a pressure associated with a fuel system of an internal combustion engine includes means for sensing fuel pressure of a fuel collection unit and producing said pressure signal corresponding thereto, said pressure signal having peak values corresponding to peak pressures of said fuel within said fuel collection unit;

and wherein said first operating parameter error value corresponds to an overall system bandwidth and said second operating parameter error value corresponds to an engine static timing error associated with a system for controlling operation of said internal combustion engine.

8. The apparatus of claim 6 wherein said means for sensing a pressure associated with a fuel system of an internal combustion engine includes means for sensing pressure of a combustion chamber of said internal combustion engine and producing said pressure signal corresponding thereto, said pressure signal having peak values corresponding to peak pressures within said combustion chamber;

and wherein said first operating parameter error value corresponds to an overall system bandwidth and said second operating parameter error value corresponds to a combined engine static timing error associated with a system for controlling operation of said internal combustion engine and a fuel pump phasing error associated with said fuel system.

9. The apparatus of claim 1 further including means responsive to said first and second engine positions for determining first and second offset values corresponding to differences between respective ones of said first and second engine positions and said reference engine position, said first operating parameter error value being a function of said first and second offset values.

10. The apparatus of claim 9 wherein said first operating parameter error value corresponds to an overall system bandwidth.

11. The apparatus of claim 9 wherein said means for sensing a pressure associated with a fuel system of an internal combustion engine includes means for sensing fuel pressure of a fuel collection unit and producing said pressure signal corresponding thereto, said pressure signal having peak values corresponding to peak pressures of said fuel within said fuel collection unit.

12. The apparatus of claim 11 wherein said first operating parameter error value includes a combined engine static timing error associated with a system for controlling operation of said internal combustion engine and a fuel pump phasing error associated with said fuel system.

13. The apparatus of claim 9 wherein said means for sensing a pressure associated with a fuel system of an internal combustion engine includes means for sensing a pressure of a combustion chamber of said internal combustion engine and producing said pressure signal corresponding thereto, said pressure signal having peak values corresponding to peak pressures within said combustion chamber.

14. The apparatus of claim 13 wherein said first operating parameter error value includes an engine static timing error associated with a system for controlling operation of said internal combustion engine.

15. Apparatus for determining errors in monitored operating parameters of a fuel system for an internal combustion engine, comprising:

a pressure sensor for sensing a pressure associated with a fuel system of an internal combustion engine and producing a pressure signal corresponding thereto, said pressure signal having peak values corresponding to peak pressures thereof;

means for determining a reference position of said internal combustion engine and producing a reference position signal corresponding to; and a control circuit responsive to said pressure signal for determining a first engine position at which a peak value of said pressure signal occurs, said control circuit determining an operating parameter error value as a function of said first engine position relative to said reference engine position.

16. The apparatus of claim 15 wherein said means for determining a reference engine position and producing a reference engine position signal corresponding thereto includes an engine position sensor operable to produce position signal indicative of a predefined engine position;

and wherein said control circuit is responsive to said position signal to determine said reference engine position as an engine position relative to said predefined engine position at which a top dead center (TDC) position associated with a fuel pump of said fuel system occurs.

17. The apparatus of claim 15 further including means for correcting said pressure signal relative to said reference position signal based on said operating parameter error value.

18. The apparatus of claim 15 wherein said control circuit is responsive to said first engine position to determine an offset value corresponding to a difference between said first engine position and said reference engine position, said operating parameter error value being a function of said offset value.

19. The apparatus of claim 18 wherein said operating parameter error value corresponds to an overall system bandwidth.

20. The apparatus of claim 19 wherein said pressure sensor is operable to sense a fuel pressure of fuel within a fuel collection unit and producing said pressure signal corresponding thereto, said pressure signal having peak values corresponding to peak pressures of fuel within said fuel collection unit;

and wherein said operating parameter error value corresponds to a combined engine static timing error associated with a system for controlling operation of said internal combustion engine and a fuel pump phasing error associated with said fuel system.

21. The apparatus of claim 19 wherein said pressure sensor is operable to sense a pressure within a combustion chamber of said internal combustion engine and producing said pressure signal corresponding thereto, said pressure signal having peak values corresponding to peak pressures within said combustion chamber;

and wherein said operating parameter error value corresponds to an engine static timing error associated with a system for controlling operation of said internal combustion engine.

22. A method of determining errors in monitored operating parameters of a fuel system for an internal combustion engine, the method comprising the steps of:

sensing a pressure associated with a fuel system of an internal combustion engine and producing a pressure signal having peak values corresponding to peak pressures thereof;

sensing a reference position associated with the operation of said internal combustion engine;

determining an offset value as a difference between an engine position at which peak values of said pressure signal occur and said reference engine position; and determining an operating parameter error value as a function of said offset value.

23. The method of claim 22 wherein said operating parameter error value corresponds to an overall system bandwidth.

24. The method of claim 22 wherein the step of sensing a pressure associated with a fuel system of an internal combustion engine includes sensing a pressure of a combustion chamber of said internal combustion engine, said pressure signal having peak values corresponding to peak pressures within said combustion chamber;

and wherein said operating parameter error value corresponds to an engine static timing error associated with a system for controlling operation of said internal combustion engine.

25. The method of claim 22 further including the step of correcting said pressure signal relative to said reference engine position based on said operating parameter error value.

26. The method of claim 22 wherein the step of sensing a pressure associated with a fuel system of an internal combustion engine includes sensing a fuel pressure of a fuel collection unit, said pressure signal having peak values corresponding to peak pressures of fuel within said collection unit;

and wherein said operating parameter error value corresponds to an engine static timing error associated with a system for controlling operation of said internal combustion engine.

27. The method of claim 26 wherein said operating parameter error value further includes a fuel pump phasing error associated with said fuel system.

* * * * *

UNITED STATES PATENT AND TRADEMARK OFFICE

CERTIFICATE OF CORRECTION

PATENT NO. : 6,353,791 B1
DATED : March 5, 2002
INVENTOR(S) : Tuken et al.

It is certified that error appears in the above-identified patent and that said Letters Patent is hereby corrected as shown below:

<u>Column 12,</u>
Line 15, after "If the.." insert -- overall --.

Signed and Sealed this

Third Day of September, 2002

*Attest:*

JAMES E. ROGAN

*Attesting Officer* *Director of the United States Patent and Trademark Office*